United States Patent
Lindner

(10) Patent No.: US 8,929,290 B2
(45) Date of Patent: Jan. 6, 2015

(54) IN-BAND SIGNALING TO INDICATE END OF DATA STREAM AND UPDATE USER CONTEXT

(75) Inventor: Mark A. Lindner, Verona, WI (US)

(73) Assignee: QUALCOMM Incorporated, San Diego, CA (US)

( * ) Notice: Subject to any disclaimer, the term of this patent is extended or adjusted under 35 U.S.C. 154(b) by 118 days.

(21) Appl. No.: 13/593,175

(22) Filed: Aug. 23, 2012

(65) Prior Publication Data

US 2013/0223336 A1  Aug. 29, 2013

Related U.S. Application Data

(60) Provisional application No. 61/527,968, filed on Aug. 26, 2011.

(51) Int. Cl.
*H04W 28/06* (2009.01)
*H04L 12/801* (2013.01)
*H04L 29/06* (2006.01)
*H04W 4/10* (2009.01)

(52) U.S. Cl.
CPC ............. *H04W 28/065* (2013.01); *H04L 47/35* (2013.01); *H04L 65/607* (2013.01); *H04L 65/608* (2013.01); *H04L 65/80* (2013.01); *H04W 4/10* (2013.01); *H04L 47/34* (2013.01); *H04W 28/06* (2013.01)
USPC .......................................... 370/328; 370/522

(58) Field of Classification Search
CPC ..... H04W 4/10; H04W 76/005; H04W 76/04; H04W 28/06; H04W 28/065; H04L 47/35; H04L 47/34; H04L 65/608
USPC .................................................. 370/328, 522
See application file for complete search history.

(56) References Cited

U.S. PATENT DOCUMENTS 5,859,660 A    1/1999  Perkins et al.
6,671,323 B1 *  12/2003  Tahara et al. ............ 375/240.26
(Continued)

FOREIGN PATENT DOCUMENTS

EP    1150497 A2    10/2001

OTHER PUBLICATIONS

Ericsson, Motorola, Nokia, Siemens, Push-to-Talk over Cellular (PoC) User Plane; Transport Protocols; PoC Release 1.0, Transport Protocols, Aug. 2003, 1-37, V1.1.0, Ericsson -Motorola—Nokia—Siemens.

(Continued)

*Primary Examiner* — Min Jung
(74) *Attorney, Agent, or Firm* — Raphael Freiwirth

(57) ABSTRACT

The disclosure relates to indicating or detecting an end of a stream of data using in-band signaling. An embodiment transmits the stream of data, the stream of data comprising multiple packets, each packet of the multiple packets including a header with a marker bit field and a payload, and configures the marker bit field and/or the payload of at least one packet of the multiple packets to indicate the end of the stream of data, wherein the configuring the payload comprises reducing an amount of data contained in the payload from payloads of other packets of the multiple packets and/or setting a field in the payload indicating a countdown to a last packet of the stream of data. An embodiment receives the stream of data and detects that at least one packet of the multiple packets is configured to indicate the end of the stream of data.

68 Claims, 12 Drawing Sheets

(56) References Cited

U.S. PATENT DOCUMENTS

| | | |
|---|---|---|
| 7,688,820 B2 | 3/2010 | Forte et al. |
| 2004/0100987 A1* | 5/2004 | Marque-Pucheau ......... 370/447 |
| 2004/0120474 A1* | 6/2004 | Lopponen et al. ......... 379/88.17 |
| 2005/0091280 A1* | 4/2005 | Winter ....................... 707/104.1 |
| 2005/0227657 A1 | 10/2005 | Frankkila et al. |
| 2006/0026293 A1 | 2/2006 | Virdi et al. |
| 2006/0041431 A1* | 2/2006 | Maes ........................ 704/270.1 |
| 2006/0046758 A1* | 3/2006 | Emami-Nouri et al. ...... 455/518 |
| 2006/0229093 A1 | 10/2006 | Bhutiani et al. |
| 2006/0274656 A1* | 12/2006 | Paul et al. ..................... 370/231 |
| 2007/0002836 A1 | 1/2007 | Lindner |
| 2012/0281690 A1* | 11/2012 | Li et al. ......................... 370/352 |

OTHER PUBLICATIONS

Brassil, J et al., "Structuring Internet Media Streams With Cueing Protocols", IEEE / ACM Transactions on Networking, IEEE / ACM, New York, NY, US, vol. 10, No. 4, Aug. 1, 2002, XP011077174, ISSN: 1063-6692.

International Search Report and Written Opinion—PCT/US2012/052686—ISA/EPO—Jan. 31, 2013.

\* cited by examiner

IN-BAND SIGNALING

OUT-OF-BAND SIGNALING

IN-BAND SIGNALING WITH 2 INCOMING STREAMS

IN-BAND SIGNALING WITH SERVER

IN-BAND SIGNALING WITH SERVER

IN-BAND SIGNALING TO INDICATE END OF DATA STREAM AND UPDATE USER CONTEXT

CLAIM OF PRIORITY UNDER 35 U.S.C. §119

The present Application for Patent claims priority to Provisional Application No. 61/527,968 entitled "IN-BAND SIGNALING TO INDICATE END OF DATA STREAM AND UPDATE USER CONTEXT" filed Aug. 26, 2011, and assigned to the assignee hereof and hereby expressly incorporated by reference herein.

BACKGROUND OF THE INVENTION

1. Field of the Invention

Embodiments of the invention relate to in-band signaling to indicate an end of incoming stream of data for real-time, or near real-time and user-context update.

2. Description of the Related Art

Wireless communication systems have developed through various generations, including a first-generation analog wireless phone service (1G), a second-generation (2G) digital wireless phone service (including interim 2.5G and 2.75G networks) and a third-generation (3G) high speed data/Internet-capable wireless service. There are presently many different types of wireless communication systems in use, including Cellular and Personal Communications Service (PCS) systems. Examples of known cellular systems include the cellular Analog Advanced Mobile Phone System (AMPS), and digital cellular systems based on Code Division Multiple Access (CDMA), Frequency Division Multiple Access (FDMA), Time Division Multiple Access (TDMA), the Global System for Mobile access (GSM) variation of TDMA, and newer hybrid digital communication systems using both TDMA and CDMA technologies.

The method for providing CDMA mobile communications was standardized in the United States by the Telecommunications Industry Association/Electronic Industries Association in TIA/EIA/IS-95-A entitled "Mobile Station-Base Station Compatibility Standard for Dual-Mode Wideband Spread Spectrum Cellular System," referred to herein as IS-95. Combined AMPS & CDMA systems are described in TIA/EIA Standard IS-98. Other communications systems are described in the IMT-2000/UM, or International Mobile Telecommunications System 2000/Universal Mobile Telecommunications System, standards covering what are referred to as wideband CDMA (W-CDMA), CDMA2000 (such as CDMA2000 1xEV-DO standards, for example) or TD-SCDMA.

In W-CDMA wireless communication systems, user equipments (UEs) receive signals from fixed position Node Bs (also referred to as cell sites or cells) that support communication links or service within particular geographic regions adjacent to or surrounding the base stations. Node Bs provide entry points to an access network (AN)/radio access network (RAN), which is generally a packet data network using standard Internet Engineering Task Force (IETF) based protocols that support methods for differentiating traffic based on Quality of Service (QoS) requirements. Therefore, the Node Bs generally interact with UEs through an over the air interface and with the RAN through Internet Protocol (IP) network data packets.

In wireless telecommunication systems, Push-to-Talk (PTT) capabilities are popular with service sectors and consumers. PTT can support a "dispatch" voice service that operates over standard commercial wireless infrastructures, such as W-CDMA, CDMA, FDMA, TDMA, GSM, etc. In a dispatch model, communication between endpoints (e.g., UEs) occurs within virtual groups, wherein the voice of one "talker" is transmitted to one or more "listeners." A single instance of this type of communication is commonly referred to as a dispatch call, or simply a PTT call. A PTT call is an instantiation of a group, which defines the characteristics of a call. A group in essence is defined by a member list and associated information, such as group name or group identification.

Applications, which are receiving one or more incoming streams of data (e.g., audio, video, etc), need to update a user context when the steam of data ends. Some applications may have real-time (e.g., minimum latency) requirements for the user context update, and therefore these applications require precise and instantaneous knowledge regarding when the stream of data ends. Conventionally, the end of the stream of data can be inferred after a period of traffic inactivity, or can be expressly indicated via the use of out-of-band signaling (e.g., via an "END" signal). Generally, out-of-band signaling can be delayed and can be complex to implement. Also, relying on out-of-band signaling for indicating the end of a stream of data may leave a gap in time where the "END" signal arrives either too early or too late, which results in the possibility of truncating the stream short (e.g., if "END" signal arrives early) or permitting the stream to continue in a starved mode (e.g., if "END" signal arrives late, such that RTP packets stop arriving but there is no user-context update).

In addition, the use of inactivity timers involves updating the user context after a threshold period where no streaming packets associated with the stream of data are received. Inferring the end of a session based on an inactivity timer can be difficult because the inactivity timer must accommodate temporary network disruptions as well as actual stream termination, and a single timer value is unlikely to be appropriate for both scenarios.

SUMMARY

An embodiment of the disclosure relates to indicating an end of a stream of data using in-band signaling. An embodiment transmits the stream of data, the stream of data comprising multiple packets, each packet of the multiple packets including a header with a marker bit field and a payload, configures the marker bit field and/or the payload of at least one packet of the multiple packets to indicate the end of the stream of data, wherein the marker bit field being set in the at least one packet indicates that the payload of the at least one packet is less than payloads of other packets of the multiple packets and/or setting a field in the payload indicating a countdown to a last packet of the stream of data, detects at a server, out-of-band signaling indicating the end of the stream of data before detecting the configuring the marker bit field and the payload of the at least one packet, wherein the server performs the configuring of the marker bit field and the payload in response to the detecting the out-of-band signaling, transmits the configured at least one packet to at least one target device, and in event that no marker bit and no out-of-band signaling is detected, the server generates a packet comprising a new marker bit and transmits the generated packet with the new marker bit to the at least one target device, wherein the new marker bit indicates the end of the stream of data.

An embodiment of the disclosure relates to detecting an end of a stream of data using in-band signaling. An embodiment receives the stream of data, the stream of data comprising multiple packets, each packet of the multiple packets including a header with a marker bit field and a payload, detects that at least one packet of the multiple packets is configured to indicate the end of the stream of data, that the payload of the at least one packet contains an amount of data less than payloads of other packets of the multiple packets, and/or that the payload of the at least one packet contains a field indicating a countdown to a last packet of the stream of data, detects at a server, out-of-band signaling indicating the end of the stream of data before detecting the configuring of the at least one packet, wherein the server performs the configuring in response to the detecting the out-of-band signaling, transmits the configured at least one packet to at least one target device, and in event that no marker bit and no out-of-band signaling is detected, the server generates a packet comprising a new marker bit and transmits the generated packet with the new marker bit to the at least one target device, wherein the new marker bit indicates the end of the data stream.

Further scope of the applicability of the described methods and apparatuses will become apparent from the following detailed description, claims, and drawings. The detailed description and specific examples, while indicating specific examples of the disclosure and claims, are given by way of illustration only, since various changes and modifications within the spirit and scope of the description will become apparent to those skilled in the art.

BRIEF DESCRIPTION OF THE DRAWINGS

A more complete appreciation of embodiments of the invention and many of the attendant advantages thereof will be readily obtained as the same becomes better understood by reference to the following detailed description when considered in connection with the accompanying drawings which are presented solely for illustration and not limitation of the invention, and in which.

DETAILED DESCRIPTION

Figure 1:
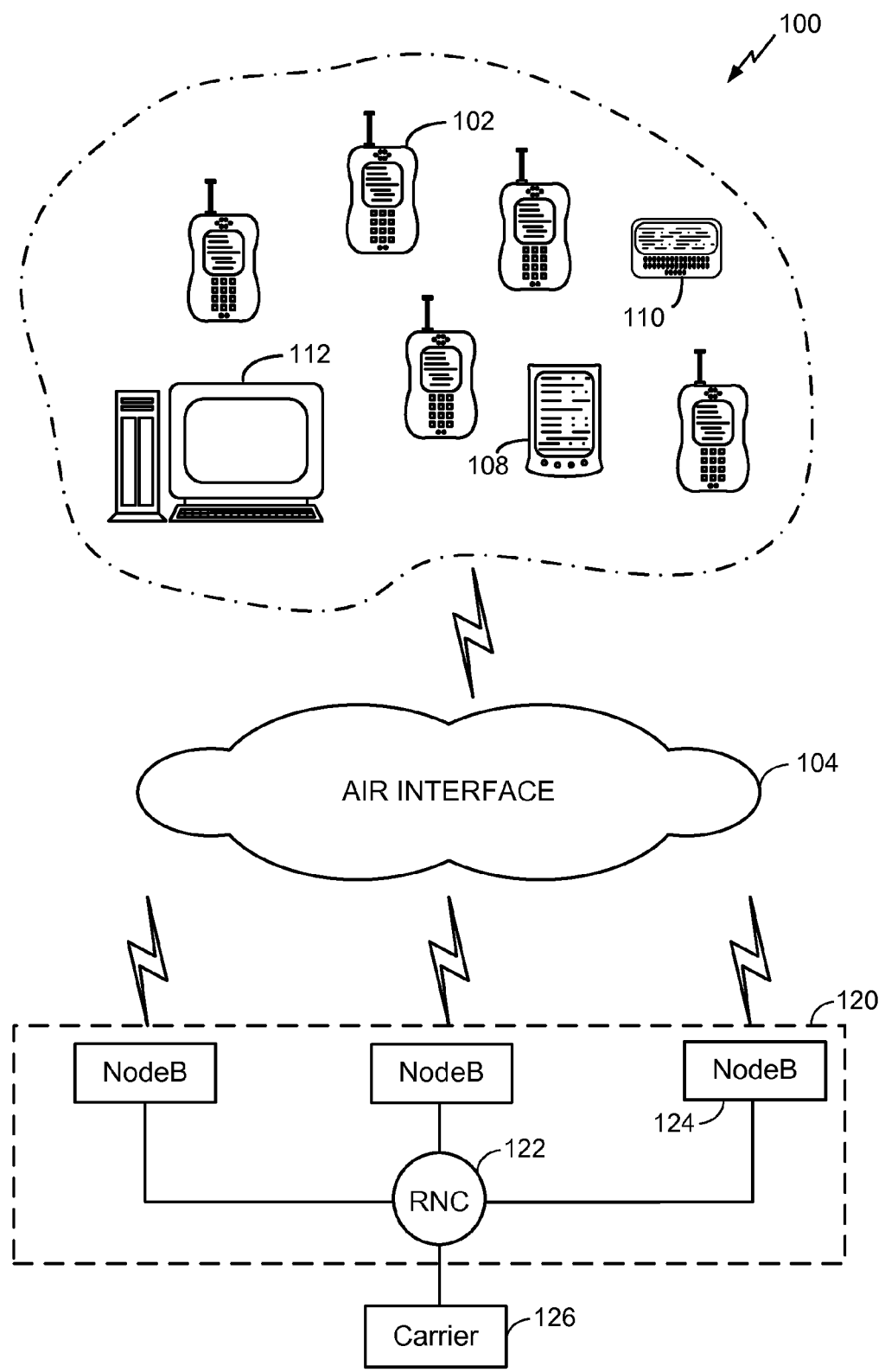
FIG. 1 is a diagram of a wireless network architecture that supports access terminals and access networks in accordance with at least one embodiment of the invention.

Aspects of the invention are disclosed in the following description and related drawings directed to specific embodiments. Alternate embodiments may be devised without departing from the scope of the invention. Additionally, well-known elements of the embodiments will not be described in detail or will be omitted so as not to obscure the relevant details of the embodiments.

The words "exemplary" and/or "example" are used herein to mean "serving as an example, instance, or illustration." Any embodiment described herein as "exemplary" and/or "example" is not necessarily to be construed as preferred or advantageous over other embodiments. Likewise, the term "embodiments of the invention" does not require that all embodiments include the discussed feature, advantage or mode of operation.

Further, many embodiments are described in terms of sequences of actions to be performed by, for example, elements of a computing device. It will be recognized that various actions described herein can be performed by specific circuits (e.g., application specific integrated circuits (ASICs)), by program instructions being executed by one or more processors, or by a combination of both. Additionally, these sequence of actions described herein can be considered to be embodied entirely within any form of computer readable storage medium having stored therein a corresponding set of computer instructions that upon execution would cause an associated processor to perform the functionality described herein. Thus, the various aspects of the embodiments may be embodied in a number of different forms, all of which have been contemplated to be within the scope of the claimed subject matter. In addition, for each of the embodiments described herein, the corresponding form of any such embodiments may be described herein as, for example, "logic configured to" perform the described action.

A High Data Rate (HDR) subscriber station, referred to herein as user equipment (UE), may be mobile or stationary, and may communicate with one or more access points (APs), which may be referred to as Node Bs. A UE transmits and receives data packets through one or more of the Node Bs to a Radio Network Controller (RNC). The Node Bs and RNC are parts of a network called a radio access network (RAN). A radio access network can transport voice and data packets between multiple access terminals.

The radio access network may be further connected to additional networks outside the radio access network, such core network including specific carrier related servers and devices and connectivity to other networks such as a corporate intranet, the Internet, public switched telephone network (PSTN), a Serving General Packet Radio Services (GPRS) Support Node (SGSN), a Gateway GPRS Support Node (GGSN), and may transport voice and data packets between each UE and such networks. A UE that has established an active traffic channel connection with one or more Node Bs may be referred to as an active UE, and can be referred to as being in a traffic state. A UE that is in the process of establishing an active traffic channel (TCH) connection with one or more Node Bs can be referred to as being in a connection setup state. A UE may be any data device that communicates through a wireless channel or through a wired channel. A UE may further be any of a number of types of devices including but not limited to PC card, compact flash device, external or internal modem, or wireless or wireline phone. The communication link through which the UE sends signals to the Node B(s) is called an uplink channel (e.g., a reverse traffic channel, a control channel, an access channel, etc.). The communication link through which Node B(s) send signals to a UE is called a downlink channel (e.g., a paging channel, a control channel, a broadcast channel, a forward traffic channel, etc.).

As used herein the term traffic channel (TCH) can refer to either an uplink/reverse or downlink/forward traffic channel.

FIG. 1 illustrates a block diagram of one exemplary embodiment of a wireless communications system 100 in accordance with at least one embodiment. System 100 can contain UEs, such as cellular telephone 102, in communication across an air interface 104 with an access network or radio access network (RAN) 120 that can connect the access terminal 102 to network equipment providing data connectivity between a packet switched data network (e.g., an intranet, the Internet, and/or core network 126) and the UEs 102, 108, 110, 112. As shown here, the UE can be a cellular telephone 102, a personal digital assistant 108, a pager 110, which is shown here as a two-way text pager, or even a separate computer platform 112 that has a wireless communication portal. The various embodiments can thus be realized on any form of access terminal including a wireless communication portal or having wireless communication capabilities, including without limitation, wireless modems, PCMCIA cards, personal computers, telephones, or any combination or sub-combination thereof. Further, as used herein, the term "UE" in other communication protocols (i.e., other than W-CDMA) may be referred to interchangeably as an "access terminal", "AT", "wireless device", "client device", "mobile terminal", "mobile station" and variations thereof.

Referring back to FIG. 1, the components of the wireless communications system 100 and interrelation of the elements of the exemplary embodiments are not limited to the configuration illustrated. System 100 is merely exemplary and can include any system that allows remote UEs, such as wireless client computing devices 102, 108, 110, 112 to communicate over-the-air between and among each other and/or between and among components connected via the air interface 104 and RAN 120, including, without limitation, core network 126, the Internet, PSTN, SGSN, GGSN and/or other remote servers.

The RAN 120 controls messages (typically sent as data packets) sent to a RNC 122. The RNC 122 is responsible for signaling, establishing, and tearing down bearer channels (i.e., data channels) between a Serving General Packet Radio Services (GPRS) Support Node (SGSN) and the UEs 102/108/110/112. If link layer encryption is enabled, the RNC 122 also encrypts the content before forwarding it over the air interface 104. The function of the RNC 122 is well-known in the art and will not be discussed further for the sake of brevity. The core network 126 may communicate with the RNC 122 by a network, the Internet and/or a public switched telephone network (PSTN). Alternatively, the RNC 122 may connect directly to the Internet or external network. Typically, the network or Internet connection between the core network 126 and the RNC 122 transfers data, and the PSTN transfers voice information. The RNC 122 can be connected to multiple Node Bs 124. In a similar manner to the core network 126, the RNC 122 is typically connected to the Node Bs 124 by a network, the Internet and/or PSTN for data transfer and/or voice information. The Node Bs 124 can broadcast data messages wirelessly to the UEs, such as cellular telephone 102. The Node Bs 124, RNC 122 and other components may form the RAN 120, as is known in the art. However, alternate configurations may also be used and the various embodiments are not limited to the configuration illustrated. For example, in another embodiment the functionality of the RNC 122 and one or more of the Node Bs 124 may be collapsed into a single "hybrid" module having the functionality of both the RNC 122 and the Node B(s) 124.

Figure 2A:
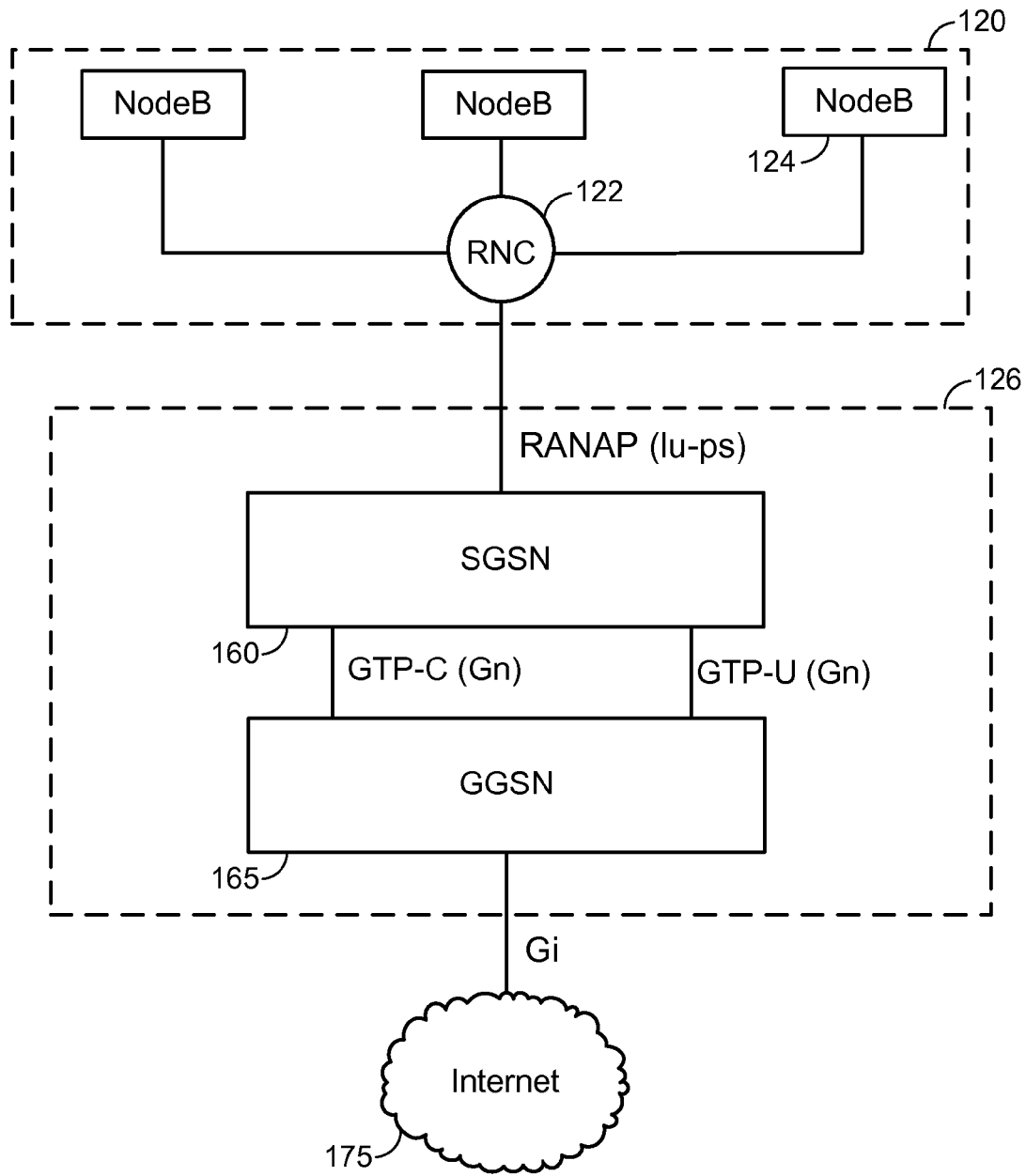
FIG. 2A illustrates the core network of FIG. 1 according to an embodiment of the present invention.

FIG. 2A illustrates the core network 126 according to an embodiment. In particular, FIG. 2A illustrates components of a General Packet Radio Services (GPRS) core network implemented within a W-CDMA system. In the embodiment of FIG. 2A, the core network 126 includes a Serving GPRS Support Node (SGSN) 160, a Gateway GPRS Support Node (GGSN) 165 and an Internet 175. However, it is appreciated that portions of the Internet 175 and/or other components may be located outside the core network in alternative embodiments.

Generally, GPRS is a protocol used by Global System for Mobile communications (GSM) phones for transmitting Internet Protocol (IP) packets. The GPRS Core Network (e.g., the GGSN 165 and one or more SGSNs 160) is the centralized part of the GPRS system and also provides support for W-CDMA based 3G networks. The GPRS core network is an integrated part of the GSM core network, provides mobility management, session management and transport for IP packet services in GSM and W-CDMA networks.

The GPRS Tunneling Protocol (GTP) is the defining IP protocol of the GPRS core network. The GTP is the protocol which allows end users (e.g., access terminals) of a GSM or W-CDMA network to move from place to place while continuing to connect to the internet as if from one location at the GGSN 165. This is achieved transferring the subscriber's data from the subscriber's current SGSN 160 to the GGSN 165, which is handling the subscriber's session.

Three forms of GTP are used by the GPRS core network; namely, (i) GTP-U, (ii) GTP-C and (iii) GTP' (GTP Prime). GTP-U is used for transfer of user data in separated tunnels for each packet data protocol (PDP) context. GTP-C is used for control signaling (e.g., setup and deletion of PDP contexts, verification of GSN reach-ability, updates or modifications such as when a subscriber moves from one SGSN to another, etc.). GTP' is used for transfer of charging data from GSNs to a charging function.

Referring to FIG. 2A, the GGSN 165 acts as an interface between the GPRS backbone network (not shown) and the external packet data network 175. The GGSN 165 extracts the packet data with associated packet data protocol (PDP) format (e.g., IP or PPP) from the GPRS packets coming from the SGSN 160, and sends the packets out on a corresponding packet data network. In the other direction, the incoming data packets are directed by the GGSN 165 to the SGSN 160 which manages and controls the Radio Access Bearer (RAB) of the destination UE served by the RAN 120. Thereby, the GGSN 165 stores the current SGSN address of the target UE and his/her profile in its location register (e.g., within a PDP context). The GGSN is responsible for IP address assignment and is the default router for the connected UE. The GGSN also performs authentication and charging functions.

The SGSN 160 is representative of one of many SGSNs within the core network 126, in an example. Each SGSN is responsible for the delivery of data packets from and to the UEs within an associated geographical service area. The tasks of the SGSN 160 includes packet routing and transfer, mobility management (e.g., attach/detach and location management), logical link management, and authentication and charging functions. The location register of the SGSN stores location information (e.g., current cell, current VLR) and user profiles (e.g., IMSI, PDP address(es) used in the packet data network) of all GPRS users registered with the SGSN 160, for example, within one or more PDP contexts for each user or UE. Thus, SGSNs are responsible for (i) de-tunneling downlink GTP packets from the GGSN 165, (ii) uplink tunnel IP packets toward the GGSN 165, (iii) carrying out mobility management as UEs move between SGSN service areas and (iv) billing mobile subscribers. As will be appreciated by one of ordinary skill in the art, aside from (i)-(iv), SGSNs configured for GSM/EDGE networks have slightly different functionality as compared to SGSNs configured for W-CDMA networks.

The RAN 120 (e.g., or UTRAN, in Universal Mobile Telecommunications System (UMTS) system architecture) communicates with the SGSN 160 via a Radio Access Network Application Part (RANAP) protocol. RANAP operates over a Iu interface (Iu-ps), with a transmission protocol such as Frame Relay or IP. The SGSN 160 communicates with the GGSN 165 via a Gn interface, which is an IP-based interface between SGSN 160 and other SGSNs (not shown) and internal GGSNs, and uses the GTP protocol defined above (e.g., GTP-U, GTP-C, GTP', etc.). In the embodiment of FIG. 2, the Gn between the SGSN 160 and the GGSN 165 carries both the GTP-C and the GTP-U. While not shown in FIG. 2A, the Gn interface is also used by the Domain Name System (DNS). The GGSN 165 is connected to a Public Data Network (PDN) (not shown), and in turn to the Internet 175, via a Gi interface with IP protocols either directly or through a Wireless Application Protocol (WAP) gateway.

Figure 2B:
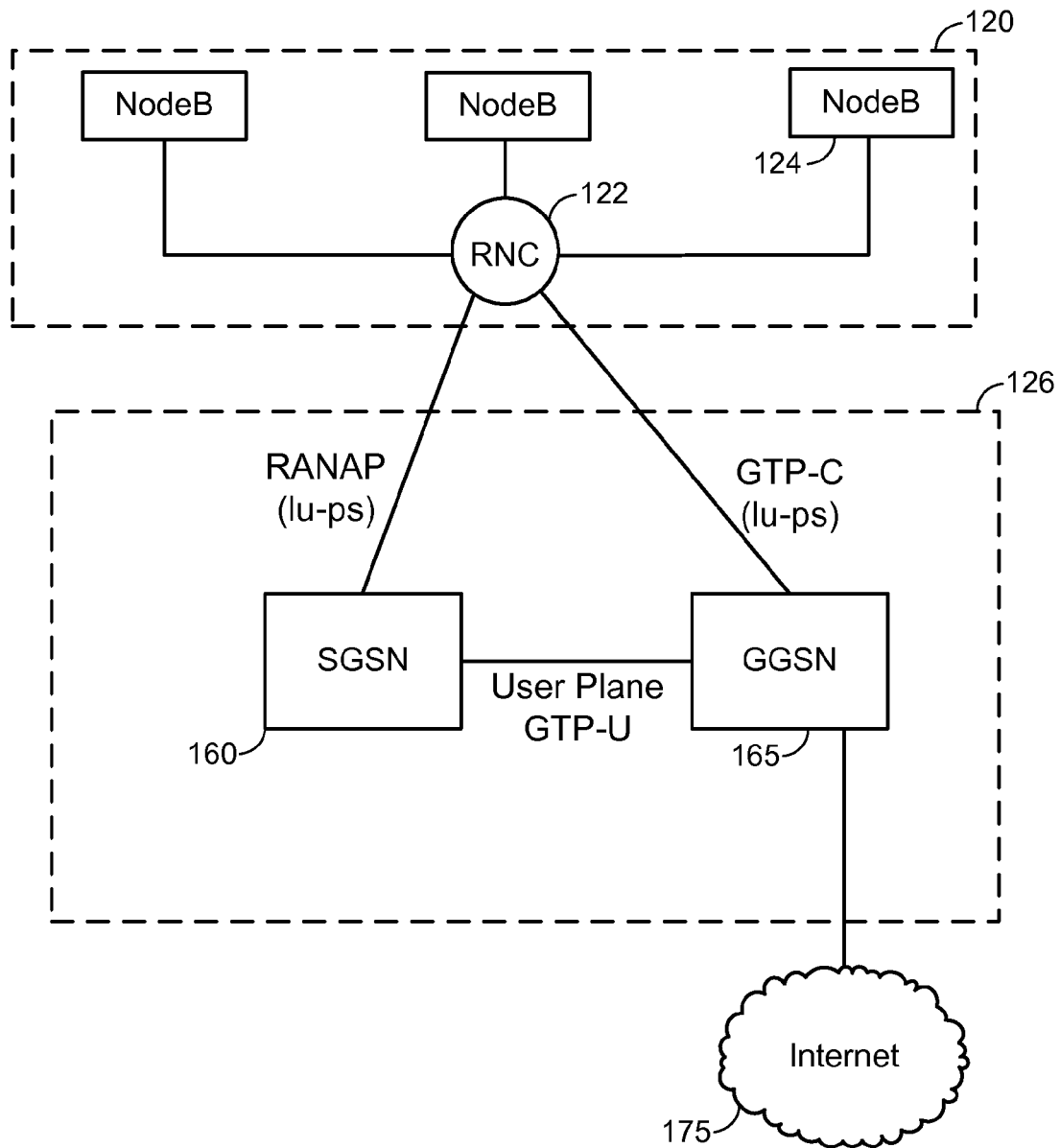
FIG. 2B illustrates the core network of FIG. 1 according to another embodiment of the present invention.

FIG. 2B illustrates the core network 126 according to another embodiment. FIG. 2B is similar to FIG. 2A except that FIG. 2B illustrates an implementation of direct tunnel functionality.

Direct Tunnel is an optional function in Iu mode that allows the SGSN 160 to establish a direct user plane tunnel between RAN and GGSN within the Packet Switched (PS) domain. A direct tunnel capable SGSN, such as SGSN 160 in FIG. 2B, can be configured on a per GGSN and per RNC basis whether or not the SGSN can use a direct user plane connection. The SGSN 160 in FIG. 2B handles the control plane signaling and makes the decision when to establish Direct Tunnel. When the Radio Bearer (RAB) assigned for a PDP context is released (i.e. the PDP context is preserved) the GTP-U tunnel is established between the GGSN 165 and SGSN 160 in order to be able to handle the downlink packets.

The optional Direct Tunnel between the SGSN 160 and GGSN 165 is not typically allowed (i) in the roaming case (e.g., because the SGSN needs to know whether the GGSN is in the same or different PLMN), (ii) where the SGSN has received Customized Applications for Mobile Enhanced Logic (CAMEL) Subscription Information in the subscriber profile from a Home Location Register (HLR) and/or (iii) where the GGSN 165 does not support GTP protocol version 1. With respect to the CAMEL restriction, if Direct Tunnel is established then volume reporting from SGSN 160 is not possible as the SGSN 160 no longer has visibility of the User Plane. Thus, since a CAMEL server can invoke volume reporting at anytime during the life time of a PDP Context, the use of Direct Tunnel is prohibited for a subscriber whose profile contains CAMEL Subscription Information.

The SGSN 160 can be operating in a Packet Mobility Management (PMM)-detached state, a PMM-idle state or a PMM-connected state. In an example, the GTP-connections shown in FIG. 2B for Direct Tunnel function can be established whereby the SGSN 160 is in the PMM-connected state and receives an Iu connection establishment request from the UE. The SGSN 160 ensures that the new Iu connection and the existing Iu connection are for the same UE, and if so, the SGSN 160 processes the new request and releases the existing Iu connection and all RABs associated with it. To ensure that the new Iu connection and the existing one are for the same UE, the SGSN 160 may perform security functions. If Direct Tunnel was established for the UE, the SGSN 160 sends an Update PDP Context Request(s) to the associated GGSN(s) 165 to establish the GTP tunnels between the SGSN 160 and GGSN(s) 165 in case the Iu connection establishment request is for signaling only. The SGSN 160 may immediately establish a new direct tunnel and send Update PDP Context Request(s) to the associated GGSN(s) 165 and include the RNC's Address for User Plane, a downlink Tunnel Endpoint Identifier (TEID) for data in case the Iu connection establishment request is for data transfer.

The UE also performs a Routing Area Update (RAU) procedure immediately upon entering PMM-IDLE state when the UE has received a RRC Connection Release message with cause "Directed Signaling connection re-establishment" even if the Routing Area has not changed since the last update. In an example, the RNC will send the RRC Connection Release message with cause "Directed Signaling Connection re-establishment" when it the RNC is unable to contact the Serving RNC to validate the UE due to lack of Iur connection (e.g., see TS 25.331[52]). The UE performs a subsequent service request procedure after successful completion of the RAU procedure to re-establish the radio access bearer when the UE has pending user data to send.

The PDP context is a data structure present on both the SGSN 160 and the GGSN 165 which contains a particular UE's communication session information when the UE has an active GPRS session. When a UE wishes to initiate a GPRS communication session, the UE must first attach to the SGSN 160 and then activate a PDP context with the GGSN 165. This allocates a PDP context data structure in the SGSN 160 that the subscriber is currently visiting and the GGSN 165 serving the UE's access point.

Figure 2C:
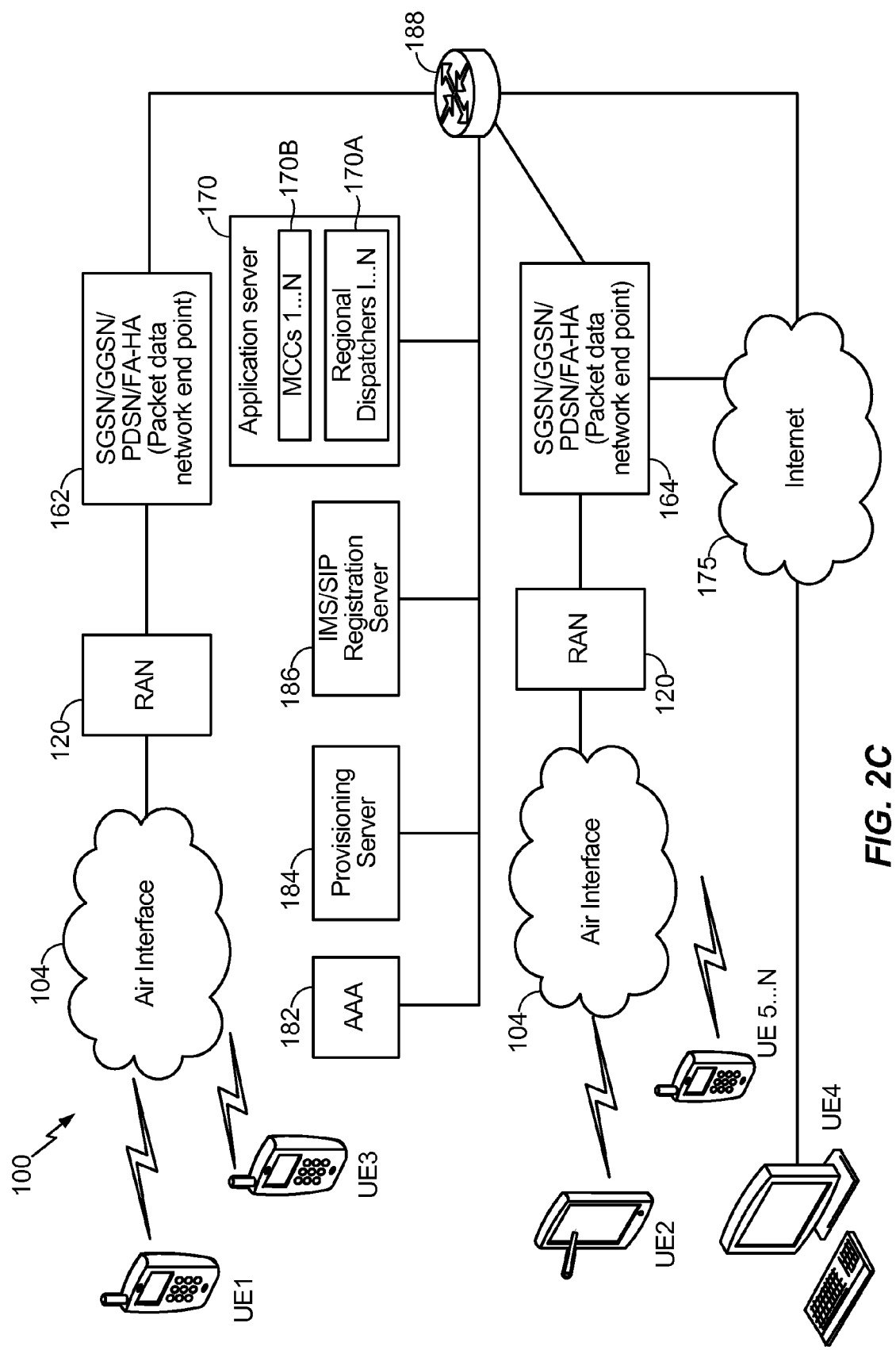
FIG. 2C illustrates an example of the wireless communications system of FIG. 1 in more detail.

FIG. 2C illustrates an example of the wireless communications system 100 of FIG. 1 in more detail. In particular, referring to FIG. 2C, UEs 1 . . . N are shown as connecting to the RAN 120 at locations serviced by different packet data network end-points. The illustration of FIG. 2C is specific to W-CDMA systems and terminology, although it will be appreciated how FIG. 2C could be modified to confirm with a 1xEV-DO system. Accordingly, UEs 1 and 3 connect to the RAN 120 at a portion served by a first packet data network end-point 162 (e.g., which may correspond to SGSN, GGSN, PDSN, a home agent (HA), a foreign agent (FA), etc.). The first packet data network end-point 162 in turn connects, via the routing unit 188, to the Internet 175 and/or to one or more of an authentication, authorization and accounting (AAA) server 182, a provisioning server 184, an Internet Protocol (IP) Multimedia Subsystem (IMS)/Session Initiation Protocol (SIP) Registration Server 186 and/or the application server 170. UEs 2 and 5 . . . N connect to the RAN 120 at a portion served by a second packet data network end-point 164 (e.g., which may correspond to SGSN, GGSN, PDSN, FA, HA, etc.). Similar to the first packet data network end-point 162, the second packet data network end-point 164 in turn connects, via the routing unit 188, to the Internet 175 and/or to one or more of the AAA server 182, a provisioning server 184, an IMS/SIP Registration Server 186 and/or the application server 170. UE 4 connects directly to the Internet 175, and through the Internet 175 can then connect to any of the system components described above.

Referring to FIG. 2C, UEs 1, 3 and 5 . . . N are illustrated as wireless cell-phones, UE 2 is illustrated as a wireless tablet-PC and UE 4 is illustrated as a wired desktop station. However, in other embodiments, it will be appreciated that the wireless communication system 100 can connect to any type of UE, and the examples illustrated in FIG. 2C are not intended to limit the types of UEs that may be implemented within the system. Also, while the AAA 182, the provisioning server 184, the IMS/SIP registration server 186 and the application server 170 are each illustrated as structurally separate servers, one or more of these servers may be consolidated in at least one embodiment.

Further, referring to FIG. 2C, the application server 170 is illustrated as including a plurality of media control complexes (MCCs) 1 . . . N 170B, and a plurality of regional dispatchers 1 . . . N 170A. Collectively, the regional dispatchers 170A and MCCs 170B are included within the application server 170, which in at least one embodiment can correspond to a distributed network of servers that collectively functions to arbitrate communication sessions (e.g., half-duplex group communication sessions via IP unicasting and/or IP multicasting protocols) within the wireless communication system 100. For example, because the communication sessions arbitrated by the application server 170 can theoretically take place between UEs located anywhere within the system 100, multiple regional dispatchers 170A and MCCs are distributed to reduce latency for the arbitrated communication sessions (e.g., so that a MCC in North America is not relaying media back-and-forth between session participants located in China). Thus, when reference is made to the application server 170, it will be appreciated that the associated functionality can be enforced by one or more of the regional dispatchers 170A and/or one or more of the MCCs 170B. The regional dispatchers 170A are generally responsible for any functionality related to establishing a communication session (e.g., handling signaling messages between the UEs, scheduling and/or sending announce messages, etc.), whereas the MCCs 170B are responsible for hosting the communication session for the duration of the call instance, including conducting an in-call signaling and an actual exchange of media during an arbitrated communication session.

Figure 3:
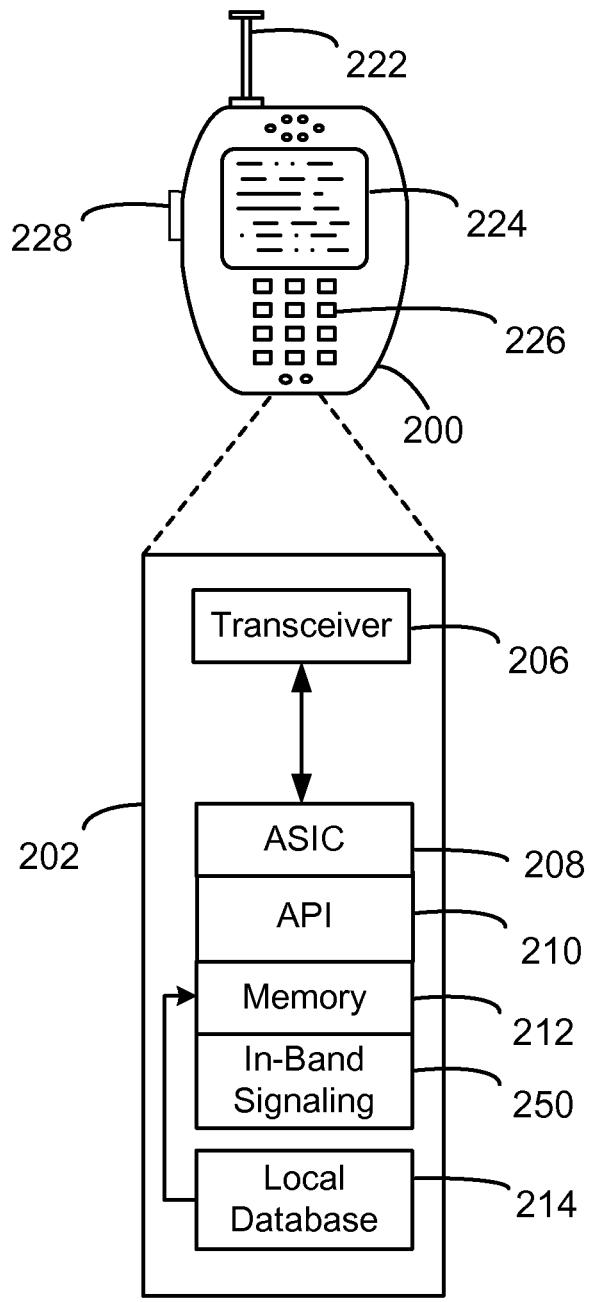
FIG. 3 is an illustration of an access terminal in accordance with at least one embodiment of the invention.

Referring to FIG. 3, a UE 200, (here a wireless device), such as a cellular telephone, has a platform 202 that can receive and execute software applications, data and/or commands transmitted from the RAN 120 that may ultimately come from the core network 126, the Internet and/or other remote servers and networks. The platform 202 can include a transceiver 206 operably coupled to an application specific integrated circuit ("ASIC" 208), or other processor, microprocessor, logic circuit, or other data processing device. The ASIC 208 or other processor executes the application programming interface ("API") 210 layer that interfaces with any resident programs in the memory 212 of the wireless device. The memory 212 can be comprised of read-only or random-access memory (RAM and ROM), EEPROM, flash cards, or any memory common to computer platforms. The platform 202 also can include a local database 214 that can hold applications not actively used in memory 212. The local database 214 is typically a flash memory cell, but can be any secondary storage device as known in the art, such as magnetic media, EEPROM, optical media, tape, soft or hard disk, or the like. The internal platform 202 components can also be operably coupled to external devices such as antenna 222, display 224, push-to-talk button 228 and keypad 226 among other components, as is known in the art.

Accordingly, an embodiment can include a UE including the ability to perform the functions described herein. As will be appreciated by those skilled in the art, the various logic elements can be embodied in discrete elements, software modules executed on a processor or any combination of software and hardware to achieve the functionality disclosed herein. For example, ASIC 208, memory 212, API 210 and local database 214 may all be used cooperatively to load, store and execute the various functions of the In-band Signaling Application 250 as disclosed herein and thus the logic to perform these functions may be distributed over various elements. Alternatively, the functionality could be incorporated into one discrete component. Therefore, the features of the UE 200 in FIG. 3A are to be considered merely illustrative and the various embodiments are not limited to the illustrated features or arrangement.

The wireless communication between the UE 102 or 200 and the RAN 120 can be based on different technologies, such as code division multiple access (CDMA), W-CDMA, time division multiple access (TDMA), frequency division multiple access (FDMA), Orthogonal Frequency Division Multiplexing (OFDM), the Global System for Mobile Communications (GSM), or other protocols that may be used in a wireless communications network or a data communications network. For example, in W-CDMA, the data communication is typically between the client device 102, Node B(s) 124, and the RNC 122. The RNC 122 can be connected to multiple data networks such as the core network 126, PSTN, the Internet, a virtual private network, a SGSN, a GGSN and the like, thus allowing the UE 102 or 200 access to a broader communication network. As discussed in the foregoing and known in the art, voice transmission and/or data can be transmitted to the UEs from the RAN using a variety of networks and configurations. Accordingly, the illustrations provided herein are not intended to limit the various embodiments and are merely to aid in the description of aspects of the embodiments.

Multimedia can be exchanged over any of the above-noted communication networks via data packets that use the Real-time Transport Protocol (RTP). RTP supports a range of multimedia formats (such as H.264, MPEG-4, MJPEG, MPEG, etc.) and allows new formats to be added without revising the RTP standard. An example of a header portion of a 40-octet overhead RTP packet may be configured as follows:

TABLE 1

Example of a RTP packet header

| | 0 1 2 3 4 5 6 7 | 8 9 10 11 12 13 14 15 | 16 17 18 19 20 21 22 23 | 24 25 26 27 28 29 30 31 |
|---|---|---|---|---|
| | Octet 1, 5, 9 . . . | Octet 2, 6, 10 . . . | Octet 3, 7, 11 . . . | Octet 4, 8, 12 . . . |
| 1-4 | Version    IHL | Type of service | Total length | |
| 5-8 | | Identification | Flags | Fragment offset |
| 9-12 | Time to live | Protocol | Header checksum | |
| 13-16 | | | Source address | |
| 17-20 | | | Destination address | |
| 21-24 | | Source port | Destination port | |
| 25-28 | | Length | Checksum | |
| 29-32 | V = 2  P  X   CC | M       PT | Sequence number | |
| 33-36 | | | Timestamp | |
| 37-40 | | | Synchronization source (SSRC) number | |

Referring to Table 1, the general fields of the RTP packet header portion are well-known in the art. After the RTP header portion, the RTP packet includes a data payload portion. The data payload portion can include digitized samples of voice and/or video. The length of the data payload can vary for different RTP packets. For example, in voice RTP packets, the length of the voice sample carried by the data payload may correspond to 20 milliseconds (ms) of sound. Generally, for longer media durations (e.g., higher-rate frames), the data payload either has to be longer as well, or else the quality of the media sample is reduced.

Generally, the RTP sender captures multimedia data (e.g., from a user of the RTP sender), which is then encoded, framed and transmitted as RTP packets with appropriate timestamps and increasing sequence numbers. The RTP packets transmitted by the RTP sender can be conveyed to a target RTP device (or RTP receiver) via a server arbitrating a session between the RTP sender and receiver, or alternatively directly from the RTP sender to the RTP receiver via peer-to-peer (P2P) protocols. The RTP receiver receives the RTP packets, detects missing packets and may perform reordering of packets. The frames are decoded depending on the payload format and presented to the user of the RTP receiver.

Figure 4:
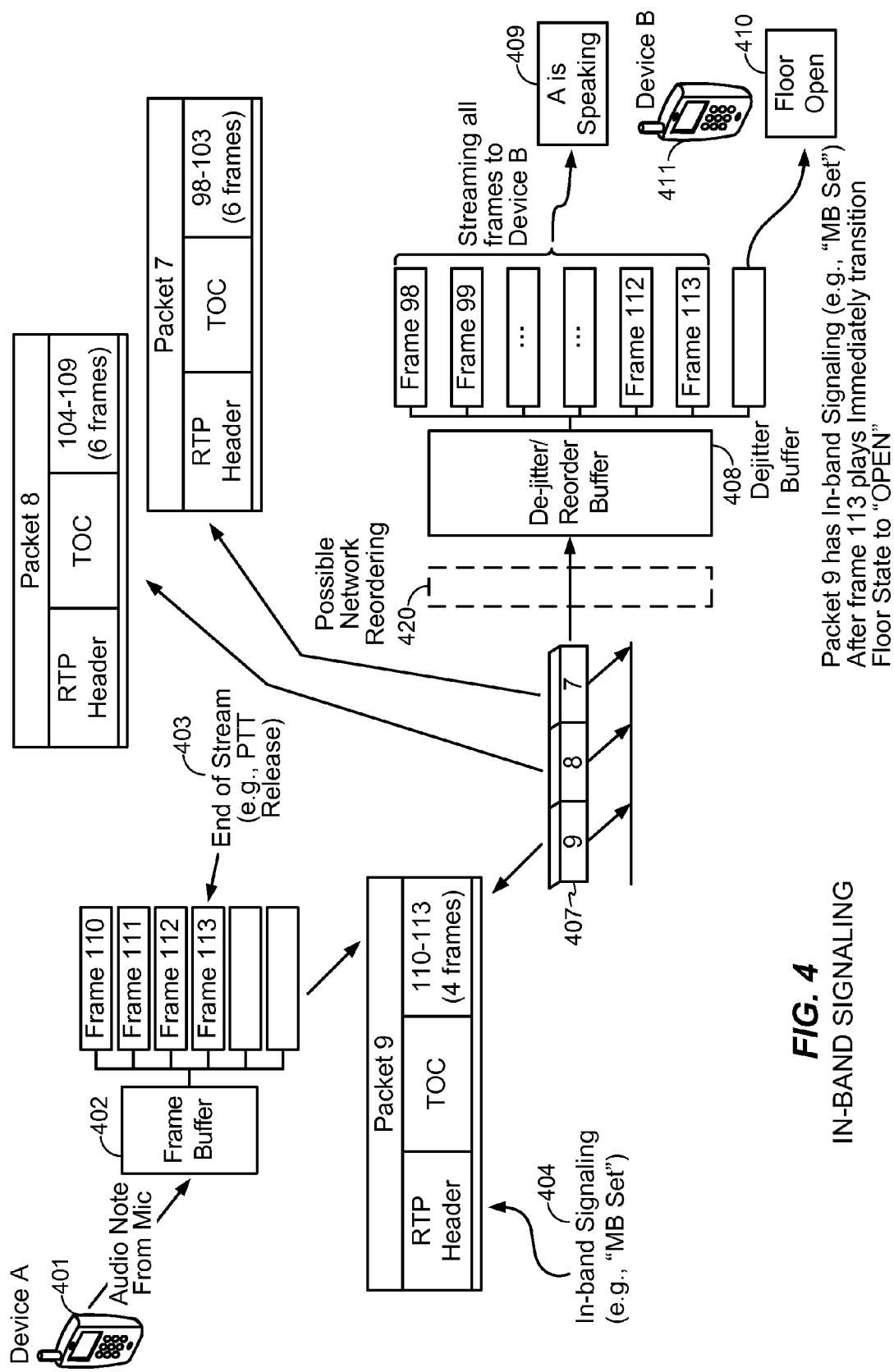
FIG. 4 is an illustration of in-band signaling to indicate end of incoming data stream in accordance with at least one embodiment of the invention.

FIG. 4 illustrates a process of terminating an RTP-based communication in accordance with an embodiment. Referring to FIG. 4, device A 401 (e.g., a UE, such as UE 200 described above) is recording audio into frame buffer 402 which contains frames 110-113 of audio data. The audio data from the frame buffer 402 are formatted into a payload of one or more RTP packets (in FIG. 4, these frames are shown as part of the payload for RTP packet 9) and transmitted during an audio transmission (or stream). At the end of the audio transmission, the user of device A 401 may affirmatively indicate an end of the audio transmission or stream (e.g., by releasing of the PTT button 403). This will cause a marker bit (MB) 404 to be set in the Real-time Transport Protocol (RTP) header of packet 9. The MB 404 is a well-known RTP header field but is not conventionally used to indicate the end of a stream of data. In fact, the MB 404 is typically used to indicate the beginning (not the end) of a stream or talk-spurt. In addition, Packet 9 contains a table of contents (TOC) and audio payload (frames 110-113). It will be noted in the illustrated example, that the packet 9 is part of a stream of packets 407 that contain the streaming audio data in various frames in packets 7, 8 and 9. In this illustrated example, packets 7 and 8, each have RTP headers, TOCs and 6 frames (frames 98-103 and frames 104-109, respectively). Packet 9 has only four frames due to the truncated audio transmission. However, the last packet in the stream 407 could have 0-6 frames, in this example, since the end of the audio transmission may occur at any arbitrary position. Further, it will be appreciated that the various embodiments are not limited to a bundling factor of 6 frames per packet, as any number of frames may be used. Regardless of the number of frames in the last packet containing the audio transmission, the last packet includes a marker bit in the RTP header to affirmatively indicate an end of the audio transmission. Also, while the MB 404 is leveraged in the embodiment of FIG. 4 for indicating the end of the stream of data (or audio transmission), it will be appreciated that other RTP header fields could be leveraged for this purpose in other embodiments.

The media stream 407 may optionally go through a server (e.g., application server 170) and be buffered and/or reordered at the network level. Additionally, network reordering 420 in a negative sense may occur (e.g., putting the packets out of order) due to path delays, routing problems, network congestion, and the like. The network reordering 420 makes it difficult to determine when the real end of the stream occurs. The various embodiments make it easier to detect the real end of the stream. Specifically, a marker-bit packet that is delivered out of order will get automatically "re-ordered" as part of the de-jitter/re-ordering buffer, meaning that it will be outputted/processed in the order it was transmitted, something that cannot easily be done with out-of-band signaling.

However, regardless if the packets are buffered and/or reordered at the network, the stream 407 will be received at device B 411 in dejitter buffer 408 and will be buffered and optionally reordered, if needed. The frames are then played out at device B and device B is in a state 409 where device A is speaking and has the floor in the PTT context. After, frame 113 is played, since the marker bit was set in the RTP header of packet 9, device B will be affirmatively notified that the stream has ended. Device B can then immediately note that the floor is now open 410 (e.g., available for audio transmission from device B or another device), and need not wait for an out-of-band signaling indication of floor availability from the application server 170. It will be appreciated that by using the in-band signaling, the end of the stream and floor state can be updated immediately, without delays due to waiting for out-of-band signaling. However, it should be noted that the floor will be "open" from the local perspective as the server may not yet be informed if it is not monitoring the in-band signaling (additional discussion on this aspect is provided in the following paragraphs).

In another aspect, to address the possibility that packet 9 is dropped and the marker bit is lost and thus the in-band end of the stream indicator is also missed, a configurable number of RTP packets including the marker bit can be sent to increase the probability that the in-band end of stream indicator (e.g., marker bit) is received. For example, the last N RTP packets of the audio transmission can carry the MB 404 with a marker bit set to indicate the end of the audio transmission (or stream). In a further example, N "empty" RTP packets (i.e., empty of audio payload data) can be transmitted after the last substantive RTP packet to ensure that the target device(s) are aware that device A's user has stopped talking.

In another aspect to address the possibility that packet 9 is dropped and the marker bit is lost and thus the in-band end of the stream indicator is also missed, the last few packets of the data stream can be configured to count down to the last packet. When the user releases the PTT button, there may still be buffered packets at device A 401. These packets can be configured with a field or byte in the payload or a header extension indicating a "countdown" to the last packet. For example, assuming packets 7-9 were still buffered at device A 401 when the user releases the PTT button, the field in packet 7 could be set to "3" to indicate that there are three more packets in the stream. Alternatively, the field in packet 7 could be set to "2" to indicate that there are two more packets before the last packet. Likewise, the field in packet 8 could be set to "2" or "1." The field in packet 9, as the last packet, could be set to "1" or "0." Alternatively, packet 9 may not include a field like packets 7 and 8, but rather have its marker bit set or a special payload, as discussed herein. Note that the field in the payload is a field in an audio payload, and not a field in a separate end-of-stream packet's payload.

Because several packets at the end of the stream of data are configured to count down to the last packet, as long as the target receives at least one of these packets, it will be able to determine which packet is or should be the last. For example, assuming device B 411 gives each packet 120 ms to be received, if device B 411 receives packet 7 but does not receive packets 8 and 9 within 240 ms, it will know that it does not need to keep waiting for a packet 10 because packet 9 was the last packet. It can instead immediately switch to another incoming stream, if there is one.

Although FIG. 4 has been described in terms of transmitting audio data, it will be apparent that device A 401 may additionally or alternatively record and transmit video and/or opaque data (e.g., x-y coordinates of a pointer being moved across the user interface of device A 401). In such a case, frames 98-103, 104-109, and 110-113 of packets 7, 8, and 9, respectively, would contain audio, video, and/or opaque data. Opaque data is data that has a hidden representation, or format, and therefore can only be manipulated by calling subroutines that have access to the representation of the opaque data.

In another aspect, device 401 may be transmitting synced audio and video streams. Since the two streams are synced, the end of the audio stream can also be determined. Accordingly, the end of one or both of the audio and video streams can be marked as in the various embodiments. It is preferable to mark the end of both streams so that if the last packet or last few packets of one stream is lost, the end of the other stream, and thus the end of the stream with the lost packets, is still known. Alternatively, only the end of one stream can be marked, and the receiver can determine the end of the other stream based on the marked stream.

As will be appreciated by one of ordinary skill in the art in view of the above-disclosure, in-band signaling has the potential to indicate a more precise point of time when the stream has truly ended from the receiver's perspective due to the difficulty in syncing out-of-band signaling with in-band media transfers. If not synchronized correctly, the out-of-band signaling may leave a gap in time, where the "END" signal arrives either too early or too late, which results in the possibility of truncating the stream short or permitting the stream to continue in a starved mode (e.g., RTP packets stop arriving but no user-context update). In-band "signaling" alleviates other additional complexity to synchronize the stream with the signaling to a server or other controlling entity. Also, the use of in-band signaling can convey the end-point of a stream of data as soon as the last (or near-last) packet in the stream of data is received and thereby can convey the end-of-session status faster than a traffic inactivity timer which would only recognize the end-of-session status a threshold period of time after the last packet in the stream was received.

Figure 5:
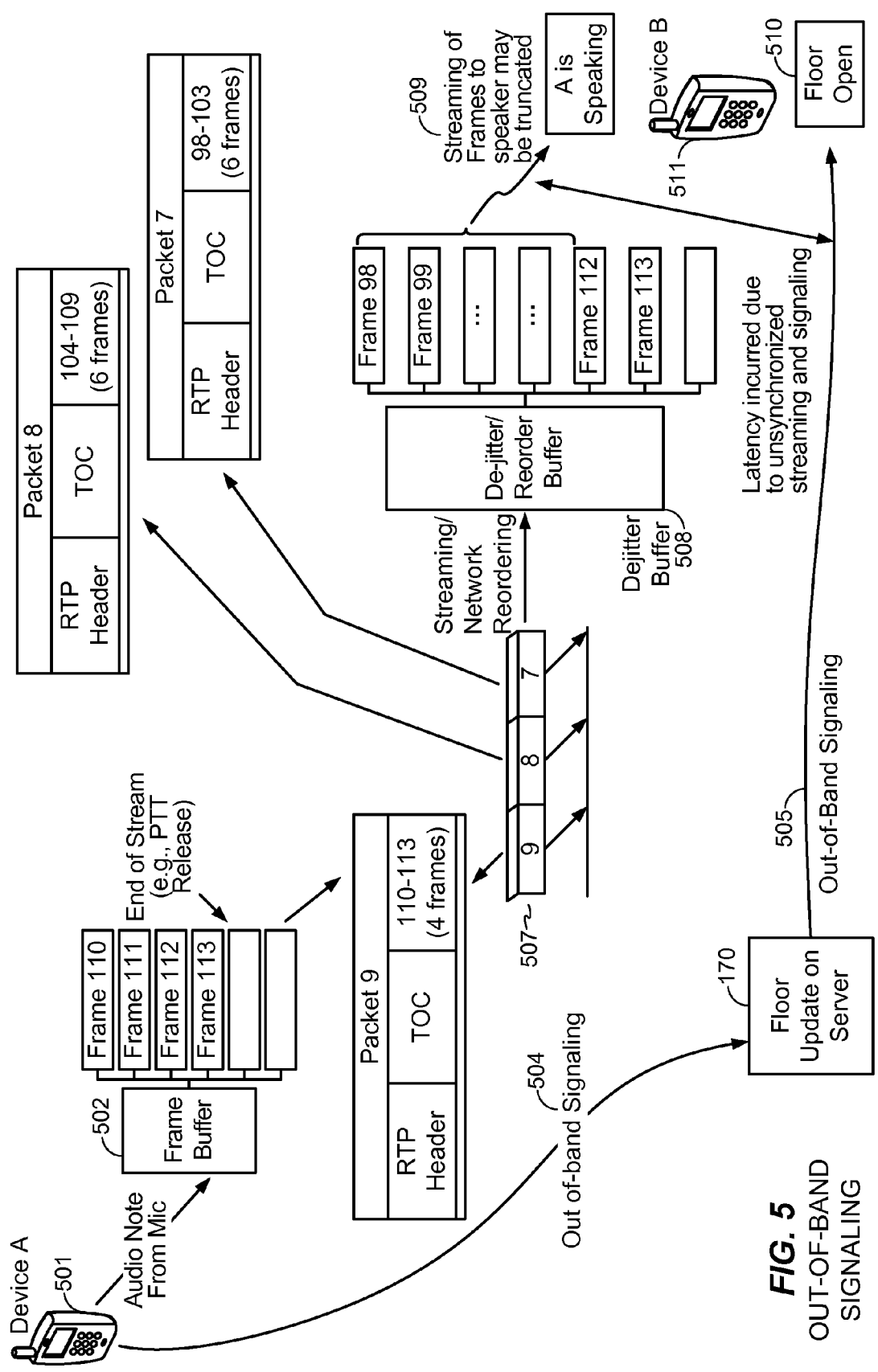
FIG. 5 is an illustration of conventional out-of-band signaling to indicate end of incoming data stream.

FIG. 5 illustrates a process of terminating an RTP-based communication session via conventional out-of-band signaling. The process of FIG. 5 is similar in some respects to the process of FIG. 4, whereby a device A 501 having a frame buffer 502 including frames of audio data, and a stream 507 containing various packets is transmitted to dejitter buffer 508 of device B 511. Additional common elements with the system of FIG. 4 will not be recited to avoid redundancy. However, in the process illustrated in FIG. 5, there is no marker bit to indicate the end of the media content (e.g. audio in a PTT call). Instead, in conventional out-of-band signaling-based session termination, device A 501 sends out-of-band signaling 504 to the application server 170 indicating that device A 501 has released the floor (e.g., stream from device A has ended). The application server 170 then processes the out-of-band signaling 504 from device A 501 and notifies the other device(s) (e.g., device B 511) using out-of-band signaling 505 that the floor has been released (which indicates both an end of stream and also indicates that the floor is open 510). Depending on the various latencies in the in-band buffers (e.g., dejitter buffer 508 or other buffers) and/or other delays, the out-of-band signaling 505 of the floor release may arrive at the target devices too early (e.g., leading to a premature release of the floor and a truncation of some of the device A 501's audio), as shown by reference 509, or alternatively may arrive too late (e.g., resulting in extended periods with no audio/media, prior to the floor being released, not shown explicitly in FIG. 5).

Figure 6:
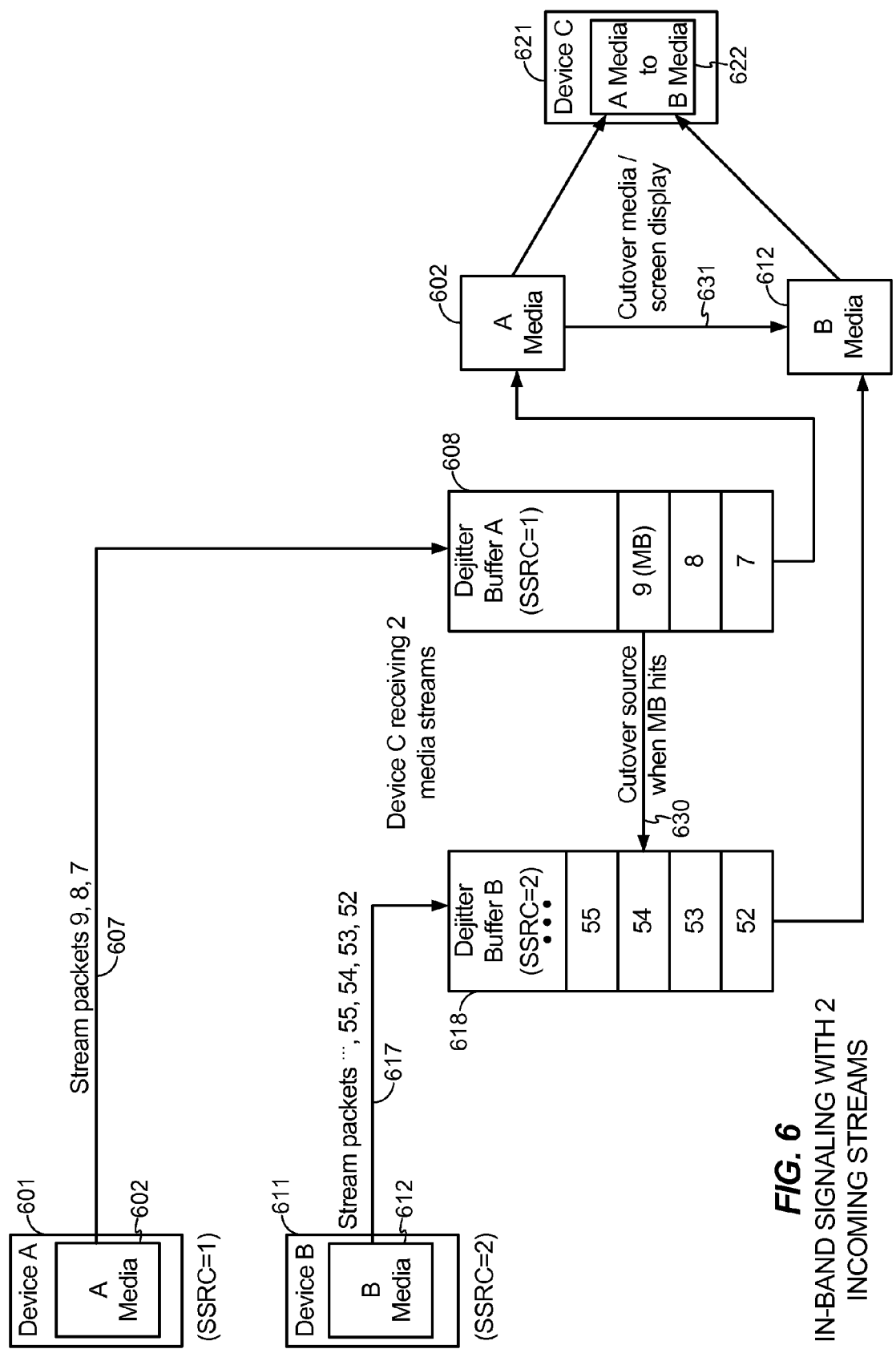
FIG. 6 illustrates an example of in-band signaling with two incoming streams in accordance with at least one embodiment of the invention.

Referring to FIG. 6, an example of in-band signaling with two incoming streams is illustrated. Device A 601 may capture media 602 (e.g., video, audio, opaque data, etc.) that can be streamed 607 in a series of packets. Likewise, device B 611 may capture B media 612 (e.g., video, audio, opaque data, etc.) that can be streamed 617 in a series of packets. Each stream can be received at device C 621 in dejitter buffer A and dejitter buffer B, respectively. Each stream has a distinct Synchronization Source (SSRC) contained in the headers of their respective RTP packets, so that device C 621 can identify and distinguish between the streams. Similar to the foregoing discussion, stream 607 contains a packet 9 that also contains a marker bit indicating the end of media or a point at which the sending device (e.g., device A) wants the media to switch. This allows for device C to immediately cutover source 630 to the second stream, which is contained in dejitter buffer 618 from the first stream dejitter buffer 608. This also results in the cutover of media 631 from A media 602 to B media 612 which can be reflected at 622 (e.g., a media player, display, etc.) on device C 621. Accordingly, a precise cutover time is provided which cannot be easily achieved using out-of-band signaling, as discussed in the foregoing.

While the foregoing provided some basic examples of the use and implementation of in-band signaling to mark and end of stream or stream transmission, it will be appreciated that the various embodiments are not limited by the foregoing examples.

Figure 7A:
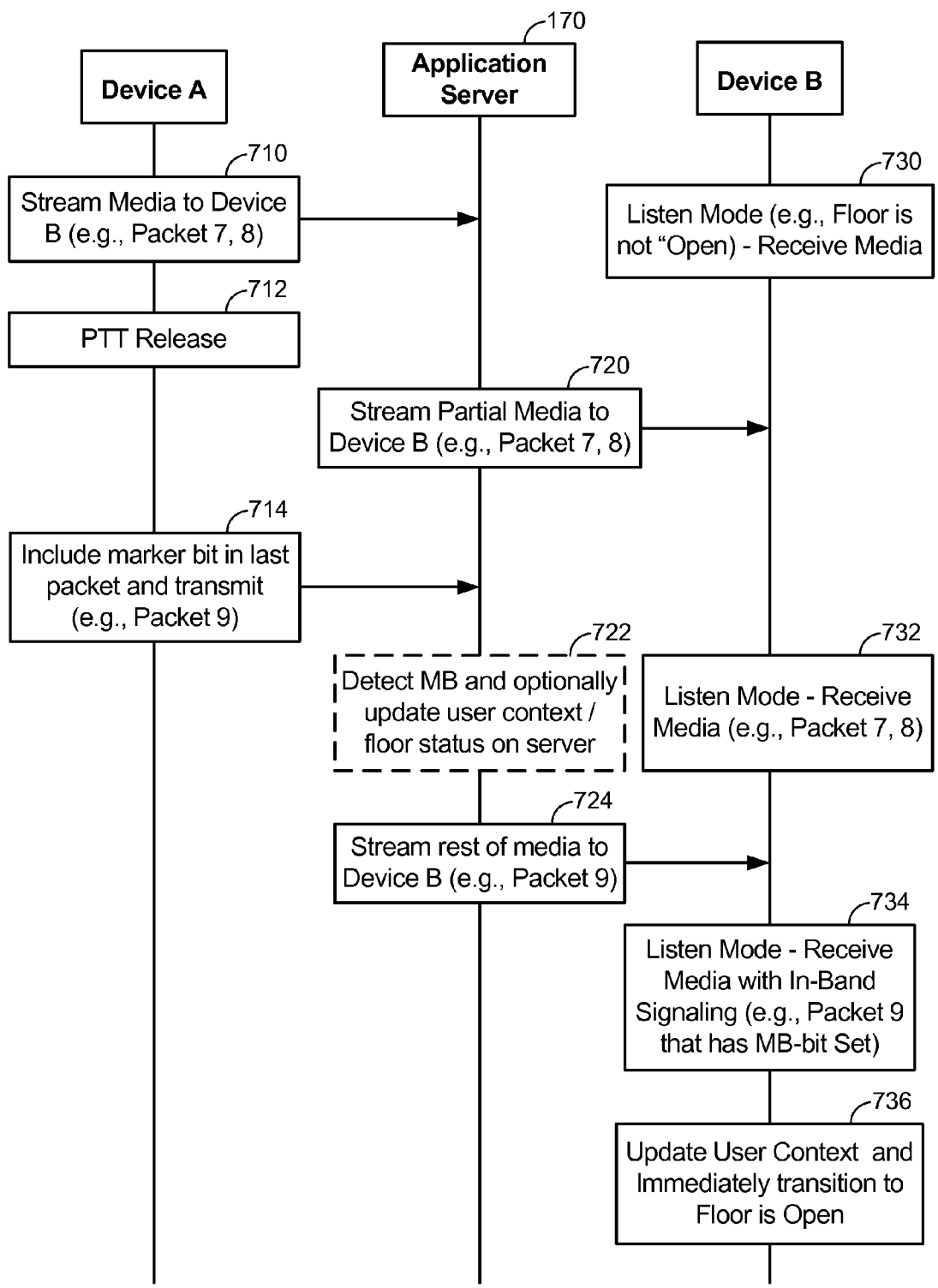
FIGS. 7A-7B illustrate examples of in-band signaling with the server detecting the marker bit.

For example, FIG. 7A illustrates a process of terminating an RTP-based communication session in accordance with an embodiment that further includes the server interaction with the in-band signaling. The process is similar to that disclosed in relation to FIG. 4, with media, such as audio, video, or opaque data, being streamed from device A to the application server 170 for transmission to device B (e.g., packets 7 and 8) in 710. The PTT button can be released in 712 and a marker bit can be added to the last packet (e.g., packet 9), which is then transmitted to the application server 170, 714. In an alternative example, if device A is streaming opaque data such as the x-y coordinates of a pointer moving across device A's screen, the user's end-of-session input at 712, i.e. PTT release, need not correspond to a PTT release but can correspond to other user input including lifting the pointer, such as a finger or a stylus, off the screen, which can signal device A to add the marker bit to the last packet of opaque data 714. In the illustrated embodiment of FIG. 7A, the application server 170 receives the media stream (e.g., packets 7 and 8) and then forwards the media stream 720 to the intended target(s) (e.g., device B). At 722, the application server 170 optionally receives and detects the packet with the marker bit. The application server 170 may actively update the context of device A and/or the floor status (e.g., open). Alternatively, the application server 170 may take no action other than detecting the marker bit. The rest of the media is streamed to the target(s) in 724. At this point the application server 170 may do nothing and await out-of-band signaling to confirm the end of media/floor release from device A.

Device B is operating in a listen mode 730 since device A has the floor. Upon receiving the streaming media (e.g., packets 7 and 8) at 732, device B will play/process these in a conventional manner. In contrast, when the last packet with the marker bit is received, 734, the user context of originating device A and floor status is changed to an open state, 736 (locally at device B).

Figure 7B:
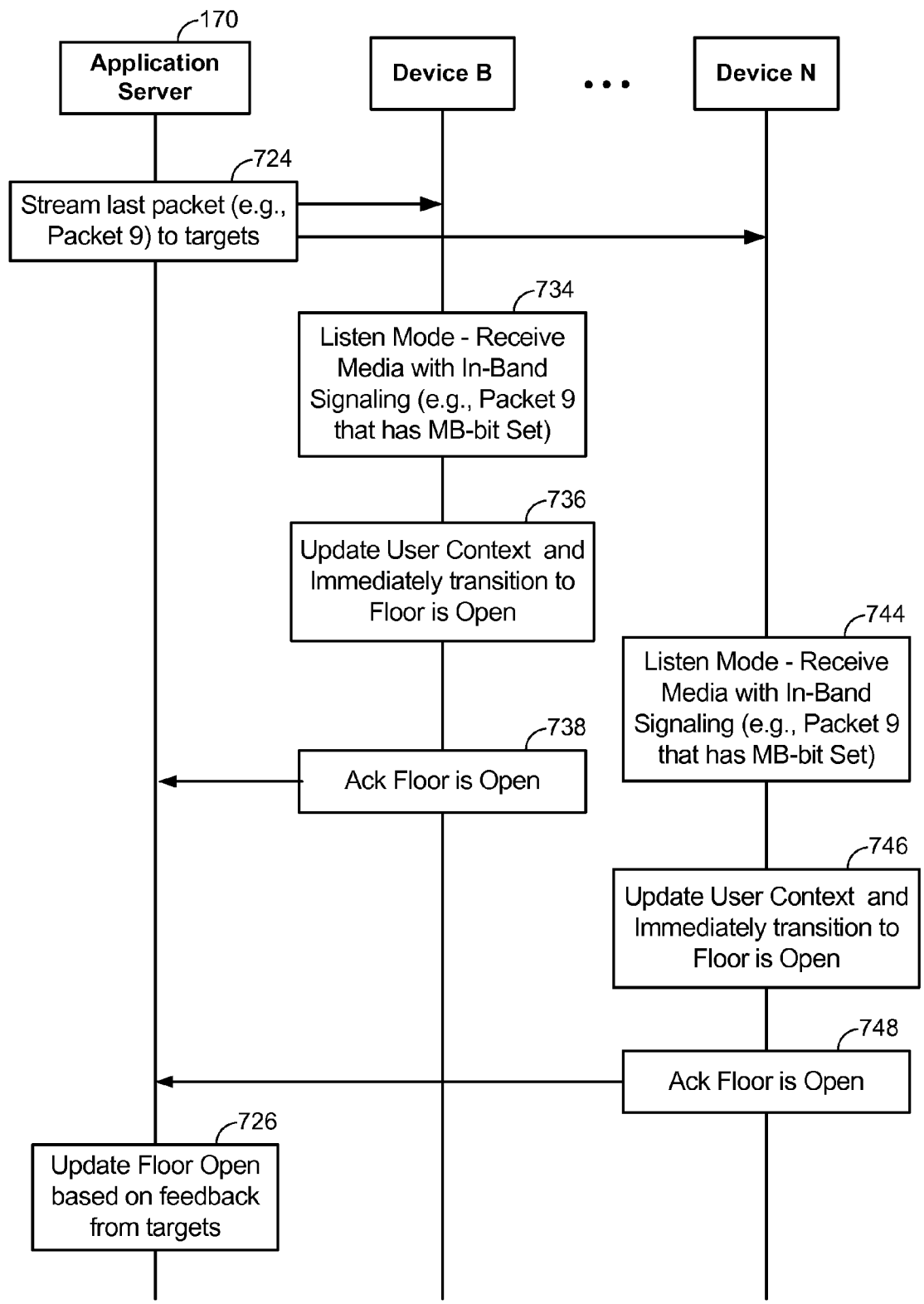

Although illustrated only with respect to device B, it will be appreciated that there can be multiple target devices and that each may have different latencies, such as illustrated in FIG. 7B, so that coordinating the floor status or other transitions using the in-band signaling and a positive acknowledgment of the in-band signaling from the targets could enhance system performance and user experience. For example, it could prevent a premature grant of the floor to faster devices.

Referring to FIG. 7B, the media from originating device A is considered to be the same as in FIG. 7A, so it is not illustrated again. Further, the illustration starts with the transmission of the last packet with the marker bit, 724, to the various targets (e.g., device B to device N). Each device receives the last packet with the marker bit, 734, 744 and the user context of originating device A and floor status is changed to an open state, 736, 746. A positive acknowledgment of the floor release (floor open) from device B, is transmitted in 738 to the application server 170. Then, at a later time, a positive acknowledgment of the floor release (floor open), 748, is transmitted from device N. Further, in this embodiment the application server 170 can await a positive confirmation from the target(s), such as illustrated in 726 before designating the floor as being open at the application server 170. This alternative embodiment is different from the conventional PTT model. In the conventional PTT model, the server does not wait until devices receiving streams Ack the end of the stream. However, in this alternative embodiment, the server doesn't reflect a floor open state until it receives an Ack (738, 748) from each target/listener in order to avoid false positives. It will be appreciated that the notion that the "floor is open" in 736 and 746 is from the device/user's perspective. Further, it will be appreciated that in FIG. 7A, the application server 170 optionally evaluated the RTP header fields of the incoming RTP packets from device A so that the application server 170 can recognize the RTP packet from device A with the marker bit set to indicate the end of the stream of data at 722 of FIG. 7A. However, the application server 170 in FIG. 7B is notified of the device A's intent to give up the floor upon receipt of the ACKs at 738 and/or 748 in FIG. 7B. Thus, in FIG. 7B, it is assumed that the optional operation of 722 from FIG. 7A is not performed.

In another aspect, the device A may end its media and provide the marker bit to indicate as such. However, shortly after, device A may want to reacquire the floor to continue. In this scenario, if the packet with the marker bit is still buffered at the application server 170 when the request/medial from device A is received, application server 170 can strip out the marker bit from the buffered packets, so there is no change in the floor state perceived by the target devices.

Figure 8:
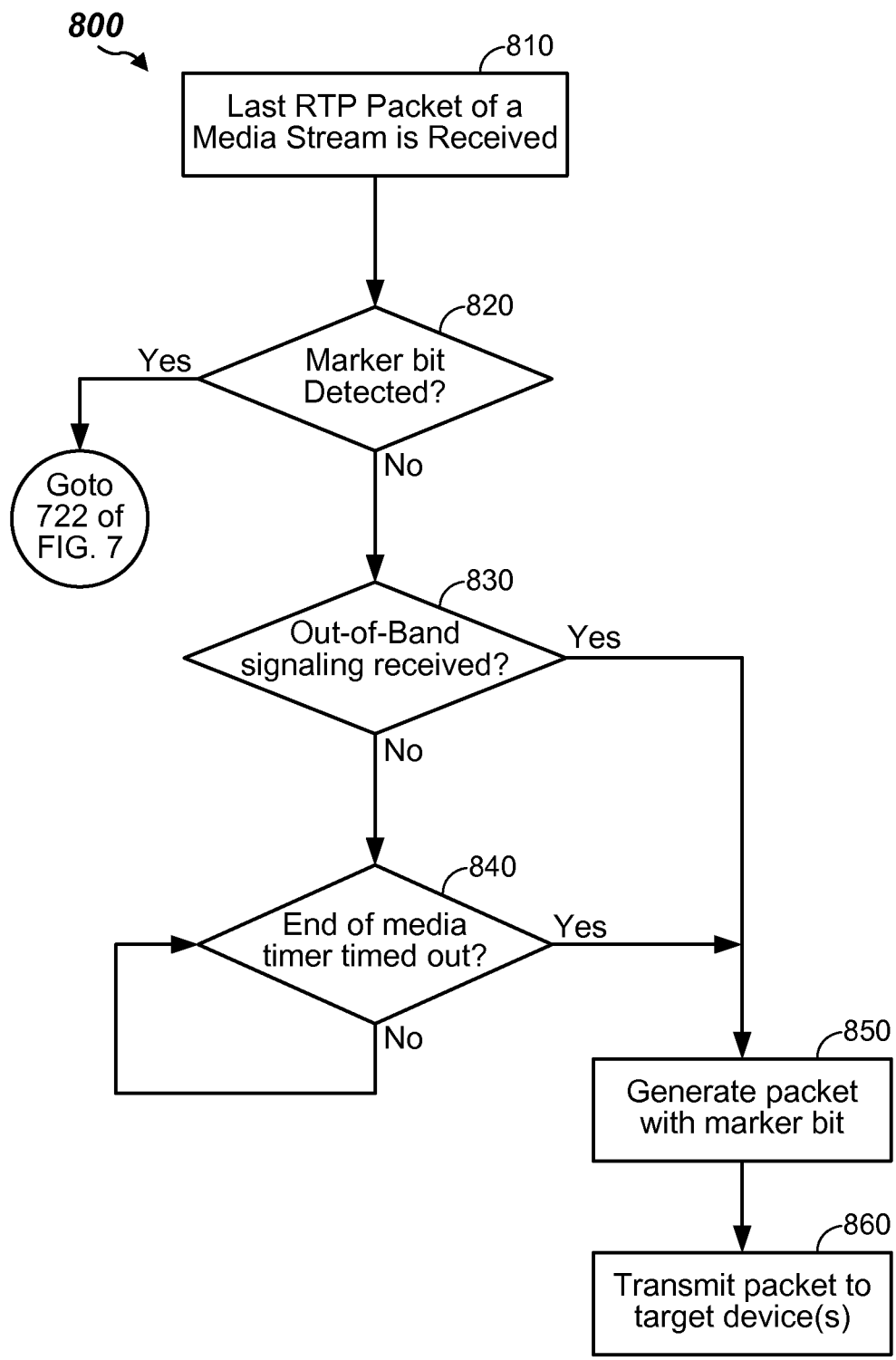
FIG. 8 illustrates an example of generating in-band signaling at the server when an end of media/floor release is detected.

FIG. 8 illustrates a flowchart 800 of an embodiment where the server can detect the marker bit. At 810, the process starts with the server receiving the last RTP packet for a particular stream of data from a transmitting device. If the server determines that the last-packet status is positively indicated by the marker bit in 820, then the process can continue as discussed in the foregoing (e.g. at 722 of FIG. 7). However, if there is no marker bit detected then alternative methods can be employed by the server to determine the end of media (e.g., out-of-band signaling, traffic inactivity timer expiration, etc.). For example, the server determines whether out-of-band signaling indicates the transmitting device's intent to stop transmitting media and/or to release the floor at 830, and the server can also determine whether a traffic inactivity timer for the connection to the transmitting device has timed out, 840. If either 830 or 840 indicate the end of the media stream (or transmission session) from the transmitting device, the server can generate a packet containing a marker bit, 850, and transmit that packet to the target device(s), 860. Accordingly, this hybrid configuration allows for conventional processing for the receiving out-of-band signaling, yet still can leverage the in-band signaling once the media end and/or floor release is determined. This can be helpful for interfacing to legacy devices or non-native systems that do not support recognition of the marker bit as an indicator of the last media packet. Finally, a watchdog (or traffic inactivity) timer can be configured to time out as an indication of the end of media and/or floor release, in 840. In the event that no media packets and no signaling is received, the server can generate a packet containing a marker bit 850 and transmit that packet to the target device(s) 860. This also can function as a backup for devices that do include a marker bit in the event that the packet or packets with the marker bit are lost or corrupted. Accordingly, detecting the marker bit at the server can allow for additional flexibility in leveraging the in-band signaling for cases where the marker bit is not received.

As noted in the foregoing the marker bit was used to describe an affirmative in-band signaling to mark the end of the media stream. However, it will be appreciated that other mechanisms can be used for in-band signaling. For example, erasure frames, null/blank rate frames, RTP packet with no payload, RTP packet with partial payload, and the like, can be used as in-band signaling to mark the end of the stream. Additionally, the in-band signaling of the end of the media stream may be indicated by any packet that doesn't conform to a full and audible packet that conforms to the rest of the streams packaging and bundling factor. Further, it will be appreciated that combinations of the foregoing can be used (e.g., marker bit and RTP packet with no payload). Accordingly, the various embodiments are not limited to any specific in-band signaling technique.

While the various embodiments are primarily described with respect to one-to-one communication sessions between UEs/devices, it will be appreciated that other embodiments can be directed to group communication sessions that can include three or more UEs, as evidenced by FIG. 7B.

Figure 9:
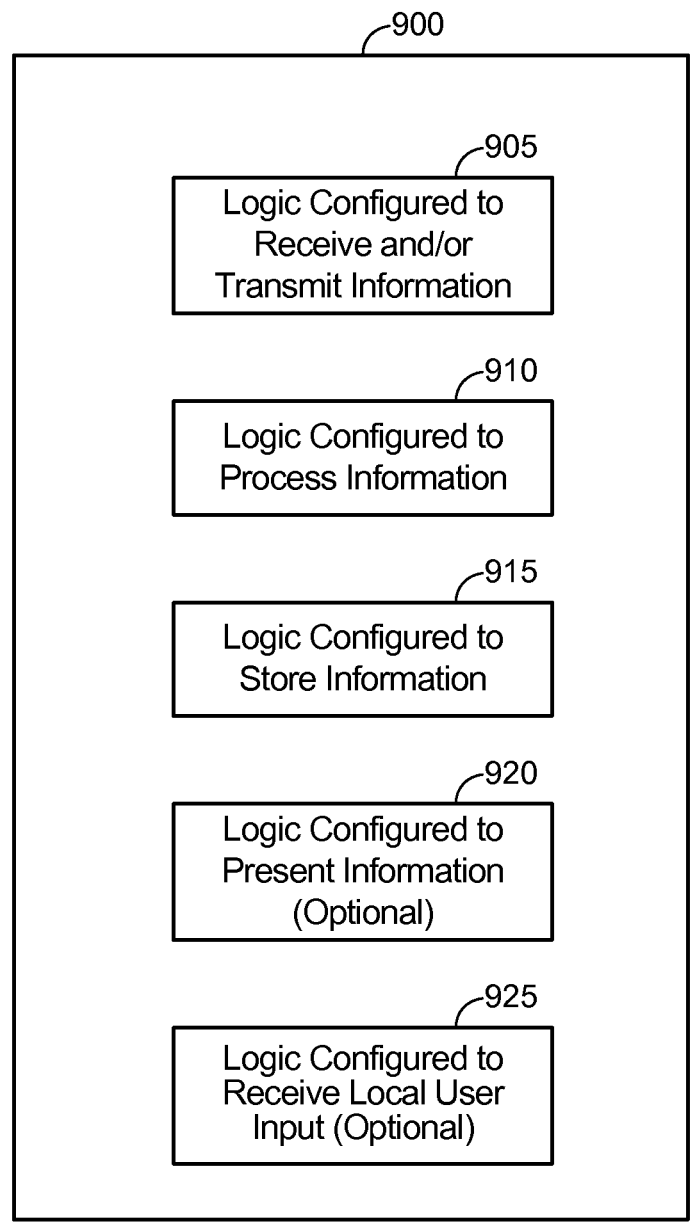
FIG. 9 illustrates a communication device that includes logic configured to perform functionality.

FIG. 9 illustrates a communication device 900 that includes logic configured to perform functionality. The communication device 900 can correspond to any of the above-noted communication devices, including but not limited to UEs 102, 108, 110, 112 or 200, Node Bs or base stations 120, the RNC or base station controller 122, a packet data network end-point (e.g., SGSN 160, GGSN 165, a Mobility Management Entity (MME) in Long Term Evolution (LTE), etc.), any of the servers 170 through 186, etc. Thus, communication device 900 can correspond to any electronic device that is configured to communicate with (or facilitate communication with) one or more other entities over a network.

Referring to FIG. 9, the communication device 900 includes logic configured to receive and/or transmit information 905. In an example, if the communication device 900 corresponds to a wireless communications device (e.g., UE 200, Node B 124, etc.), the logic configured to receive and/or transmit information 905 can include a wireless communications interface (e.g., Bluetooth, WiFi, 2G, 3G, etc.) such as a wireless transceiver and associated hardware (e.g., an RF antenna, a MODEM, a modulator and/or demodulator, etc.). In another example, the logic configured to receive and/or transmit information 905 can correspond to a wired communications interface (e.g., a serial connection, a USB or Firewire connection, an Ethernet connection through which the Internet 175 can be accessed, etc.). Thus, if the communication device 900 corresponds to some type of network-based server (e.g., SGSN 160, GGSN 165, application server 170, etc.), the logic configured to receive and/or transmit information 905 can correspond to an Ethernet card, in an example, that connects the network-based server to other communication entities via an Ethernet protocol. In a further example, the logic configured to receive and/or transmit information 905 can include sensory or measurement hardware by which the communication device 900 can monitor its local environment (e.g., an accelerometer, a temperature sensor, a light sensor, an antenna for monitoring local RF signals, etc.). The logic configured to receive and/or transmit information 905 can also include software that, when executed, permits the associated hardware of the logic configured to receive and/or transmit information 905 to perform its reception and/or transmission function(s). However, the logic configured to receive and/or transmit information 905 does not correspond to software alone, and the logic configured to receive and/or transmit information 905 relies at least in part upon hardware to achieve its functionality.

Referring to FIG. 9, the communication device 900 further includes logic configured to process information 910. In an example, the logic configured to process information 910 can include at least a processor. Example implementations of the type of processing that can be performed by the logic configured to process information 910 includes but is not limited to performing determinations, establishing connections, making selections between different information options, performing evaluations related to data, interacting with sensors coupled to the communication device 900 to perform measurement operations, converting information from one format to another (e.g., between different protocols such as .wmv to .avi, etc.), and so on. For example, the processor included in the logic configured to process information 910 can correspond to a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration. The logic configured to process information 910 can also include software that, when executed, permits the associated hardware of the logic configured to process information 910 to perform its processing function(s). However, the logic configured to process information 910 does not correspond to software alone, and the logic configured to process information 910 relies at least in part upon hardware to achieve its functionality.

Referring to FIG. 9, the communication device 900 further includes logic configured to store information 915. In an example, the logic configured to store information 915 can include at least a non-transitory memory and associated hardware (e.g., a memory controller, etc.). For example, the non-transitory memory included in the logic configured to store information 915 can correspond to RAM memory, flash memory, ROM memory, EPROM memory, EEPROM memory, registers, hard disk, a removable disk, a CD-ROM, or any other form of storage medium known in the art. The logic configured to store information 915 can also include software that, when executed, permits the associated hardware of the logic configured to store information 915 to perform its storage function(s). However, the logic configured to store information 915 does not correspond to software alone, and the logic configured to store information 915 relies at least in part upon hardware to achieve its functionality.

Referring to FIG. 9, the communication device 900 further optionally includes logic configured to present information 920. In an example, the logic configured to present information 920 can include at least an output device and associated hardware. For example, the output device can include a video output device (e.g., a display screen, a port that can carry video information such as USB, HDMI, etc.), an audio output device (e.g., speakers, a port that can carry audio information such as a microphone jack, USB, HDMI, etc.), a vibration device and/or any other device by which information can be formatted for output or actually outputted by a user or operator of the communication device 900. For example, if the communication device 900 corresponds to UE 200 as shown in FIG. 3, the logic configured to present information 920 can include the display 224. In a further example, the logic configured to present information 920 can be omitted for certain communication devices, such as network communication devices that do not have a local user (e.g., network switches or routers, remote servers, etc.). The logic configured to present information 920 can also include software that, when executed, permits the associated hardware of the logic configured to present information 920 to perform its presentation function(s). However, the logic configured to present information 920 does not correspond to software alone, and the logic configured to present information 920 relies at least in part upon hardware to achieve its functionality.

Referring to FIG. 9, the communication device 900 further optionally includes logic configured to receive local user input 925. In an example, the logic configured to receive local user input 925 can include at least a user input device and associated hardware. For example, the user input device can include buttons, a touch-screen display, a keyboard, a camera, an audio input device (e.g., a microphone or a port that can carry audio information such as a microphone jack, etc.), and/or any other device by which information can be received from a user or operator of the communication device 900. For example, if the communication device 900 corresponds to UE 200 as shown in FIG. 3, the logic configured to receive local user input 925 can include the display 224 (if implemented a touch-screen), keypad 226, etc. In a further example, the logic configured to receive local user input 925 can be omitted for certain communication devices, such as network communication devices that do not have a local user (e.g., network switches or routers, remote servers, etc.). The logic configured to receive local user input 925 can also include software that, when executed, permits the associated hardware of the logic configured to receive local user input 925 to perform its input reception function(s). However, the logic configured to receive local user input 925 does not correspond to software alone, and the logic configured to receive local user input 925 relies at least in part upon hardware to achieve its functionality.

Referring to FIG. 9, while the configured logics of 905 through 925 are shown as separate or distinct blocks in FIG. 9, it will be appreciated that the hardware and/or software by which the respective configured logic performs its functionality can overlap in part. For example, any software used to facilitate the functionality of the configured logics of 905 through 925 can be stored in the non-transitory memory associated with the logic configured to store information 915, such that the configured logics of 905 through 925 each performs their functionality (i.e., in this case, software execution) based in part upon the operation of software stored by the logic configured to transmit information 905. Likewise, hardware that is directly associated with one of the configured logics can be borrowed or used by other configured logics from time to time. For example, the processor of the logic configured to process information 910 can format data into an appropriate format before being transmitted by the logic configured to receive and/or transmit information 905, such that the logic configured to receive and/or transmit information 905 performs its functionality (i.e., in this case, transmission of data) based in part upon the operation of hardware (i.e., the processor) associated with the logic configured to process information 910.

It will be appreciated that the configured logic or "logic configured to" in the various blocks are not limited to specific logic gates or elements, but generally refer to the ability to perform the functionality described herein (either via hardware or a combination of hardware and software). Thus, the configured logics or "logic configured to" as illustrated in the various blocks are not necessarily implemented as logic gates or logic elements despite sharing the word "logic."

Those of skill in the art will appreciate that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Further, those of skill in the art will appreciate that the various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the various embodiments.

The various illustrative logical blocks, modules, and circuits described in connection with the embodiments disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The methods, sequences and/or algorithms described in connection with the embodiments disclosed herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in a user terminal (e.g., access terminal). In the alternative, the processor and the storage medium may reside as discrete components in a user terminal.

In one or more exemplary embodiments, the functions described may be implemented in hardware, software, firmware, or any combination thereof. If implemented in software, the functions may be stored on or transmitted over as one or more instructions or code on a computer-readable medium. Computer-readable media includes both computer storage media and communication media including any medium that facilitates transfer of a computer program from one place to another. A storage media may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and blu-ray disc where disks usually reproduce data magnetically, while discs reproduce data optically with lasers. Combinations of the above should also be included within the scope of computer-readable media.

While the foregoing disclosure shows illustrative embodiments of the invention, it should be noted that various changes and modifications could be made herein without departing from the scope of the invention as defined by the appended claims. The functions, steps and/or actions of the method claims in accordance with the embodiments of the invention described herein need not be performed in any particular order. Furthermore, although elements of the invention may be described or claimed in the singular, the plural is contemplated unless limitation to the singular is explicitly stated.

What is claimed is:

1. A method for indicating an end of a stream of data using in-band signaling, comprising:
    transmitting the stream of data, the stream of data comprising multiple packets, each packet of the multiple packets including a header with a marker bit field and a payload;
    configuring the marker bit field and the payload of at least one packet of the multiple packets to indicate the end of the stream of data, wherein the marker bit field being set in the at least one packet indicates that the payload of the at least one packet is less than payloads of other packets of the multiple packets, and setting a field in the payload indicating a countdown to a last packet of the stream of data;
    detecting, at a server, out-of-band signaling indicating the end of the stream of data before detecting the configuring the marker bit field and the payload of the at least one packet, wherein the server performs the configuring of the marker bit field and the payload in response to the detecting the out-of-band signaling;

transmitting the configured at least one packet to at least one target device; and in event that no marker bit and no out-of-band signaling is detected, the server generates a packet comprising a new marker bit and transmits the generated packet with the new marker bit to the at least one target device, wherein the new marker bit indicates the end of the stream of data.

2. The method of claim 1, wherein the configuring comprises configuring the marker bit field to a given bit pattern to indicate the end of the stream of data.

3. The method of claim 1, wherein the at least one packet with the marker bit field being set comprises at least one of:
includes less than a full amount of content in the payload;
includes a partial bundle of frames;
includes all blank and/or erasure frames; or
includes no payload.

4. The method of claim 1, wherein the configuring comprises configuring the marker bit field and/or a field within the payload of each packet of a range of packets immediately preceding the last packet of the stream of data to indicate the end of the stream of data.

5. The method of claim 4, wherein the range of packets are configured to act as the countdown to the last packet.

6. The method of claim 4, wherein a wireless device determines the end of the stream of data based on at least one of the range of packets.

7. The method of claim 1, wherein the configuring of the marker bit field is utilized to mark an end of an audio stream.

8. The method of claim 7, wherein the configuring of the marker bit field is utilized to mark an end of a video stream.

9. The method of claim 1, wherein the header is a Real-time Transport Protocol (RTP) header.

10. The method of claim 1, wherein the configuring is triggered by an affirmative action.

11. The method of claim 10, wherein the affirmative action is a release of a push-to-talk (PTT) button.

12. The method of claim 10, wherein the affirmative action is a lifting of a pointer from a screen of a wireless device transmitting the stream of data.

13. The method of claim 1, wherein the stream of data comprises audio, video, and/or opaque data.

14. The method of claim 13, wherein the opaque data is coordinate data of a pointer being dragged across a screen of a wireless device transmitting the stream of data.

15. The method of claim 1, wherein the stream of data is media content in a group communication.

16. The method of claim 15, wherein indicating the end of the stream of data indicates a release of a floor in the group communication.

17. The method of claim 16, further comprising:
receiving an acknowledgment of the release of the floor at a wireless device transmitting the stream of data.

18. The method of claim 1, wherein a server detects the configuring of the at least one packet and updates a user context before receiving out-of-band signaling.

19. The method of claim 1, wherein the at least one packet is the last packet of the stream of data.

20. A method for detecting an end of a stream of data using in-band signaling, comprising:
receiving the stream of data, the stream of data comprising multiple packets, each packet of the multiple packets including a header with a marker bit field and a payload;

detecting that at least one packet of the multiple packets is configured to indicate the end of the stream of data, wherein the detecting comprises detecting that the marker bit field of the at least one packet is configured to indicate the end of the stream of data, that the payload of the at least one packet contains an amount of data less than payloads of other packets of the multiple packets, and that the payload of the at least one packet contains a field indicating a countdown to a last packet of the stream of data;

detecting, at a server, out-of-band signaling indicating the end of the stream of data before detecting the configuring of the at least one packet, wherein the server performs the configuring in response to the detecting the out-of-band signaling;

transmitting the configured at least one packet to at least one target device; and in event that no marker bit and no out-of-band signaling is detected, the server generates a packet comprising a new marker bit and transmits the generated packet with the new marker bit to the at least one target device, wherein the new marker bit indicates the end of the data stream.

21. The method of claim 20, wherein the detecting comprises detecting that the marker bit field of the at least one packet is configured to a given bit pattern to indicate the end of the stream of data.

22. The method of claim 20, wherein the at least one packet is one of a range of packets immediately preceding the last packet.

23. The method of claim 22, wherein each packet of the range of packets contains a field indicating the countdown to the last packet.

24. The method of claim 20, further comprising:
determining the last packet of the stream of data based on the detecting.

25. The method of claim 24, further comprising updating a user context at a wireless device receiving the stream of data in response to the determining the last packet of the stream of data.

26. The method of claim 25, further comprising transmitting an acknowledgment to a wireless device transmitting the stream of data that the user context has been updated.

27. The method of claim 20, wherein the stream of data is a first stream of data received from a first wireless device, the method further comprising:
receiving a second stream of data from a second wireless device;
buffering the first stream of data and the second stream of data; and
switching from playing the first stream of data to playing the second stream of data in response to the detecting.

28. The method of claim 20, further comprising:
determining that a time since a last packet was received is greater than a threshold; and
in response, determining that the stream of data has ended.

29. The method of claim 20, wherein a server determines that a time since a last packet was received is greater than a threshold, and in response, generates the packet containing the marker bit field configured to indicate the end of the stream of data and transmits the generated packet to a target device.

30. The method of claim 20, wherein the marker bit field is utilized to mark an end of an audio stream.

31. The method of claim 30, wherein the marker bit field is utilized to mark an end of a video stream.

32. The method of claim 20, wherein the header is a Real-time Transport Protocol (RTP) header.

33. An apparatus for indicating an end of a stream of data using in-band signaling, comprising:
  logic configured to transmit the stream of data, the stream of data comprising multiple packets, each packet of the multiple packets including a header with a marker bit field and a payload;
  logic configured to configure the marker bit field and the payload of at least one packet of the multiple packets to indicate the end of the stream of data, wherein the logic configured to configure the marker bit field and the payload comprise logic configured to set the marker bit field in the at least one packet to indicate that the payload of the at least one packet is less than payloads of other packets of the multiple packets, and logic configured to set a field in the payload indicating a countdown to a last packet of the stream of data;
  logic configured to detect, at a server, out-of-band signaling indicating the end of the stream of data before detecting the configuring the marker bit field and the payload of the at least one packet, wherein the server performs the configuring of the marker bit field and the payload in response to the detecting the out-of-band signaling; and
  logic configured to transmit the configured at least one packet to at least one target device; and
  in event that no marker bit and no out-of-band signaling is detected, the server generates a packet comprising a new marker bit and the logic configured to transmit transmits the generated packet with the new marker bit to the at least one target device, wherein the new marker bit indicates the end of the stream of data.

34. The apparatus of claim 33, wherein the logic configured to configure comprises the logic configured to configure the marker bit field to a given bit pattern to indicate the end of the stream of data.

35. The apparatus of claim 33, wherein the at least one packet with the marker bit field set comprises at least one of:
  includes less than a full amount of content in the payload;
  includes a partial bundle of frames;
  includes all blank and/or erasure frames; or
  includes no payload.

36. The apparatus of claim 33, wherein the logic configured to configure comprises the logic configured to configure the marker bit field and/or a field within the payload of each packet of a range of packets immediately preceding the last packet of the stream of data to indicate the end of the stream of data.

37. The apparatus of claim 36, wherein the range of packets are configured to act as the countdown to the last packet.

38. The apparatus of claim 36, wherein a wireless device determines the end of the stream of data based on at least one of the range of packets.

39. The apparatus of claim 33, wherein the marker bit field is utilized to mark an end of an audio stream.

40. The apparatus of claim 33, wherein the marker bit field is utilized to mark an end of a video stream.

41. The apparatus of claim 33, wherein the header is a Real-time Transport Protocol (RTP) header.

42. The apparatus of claim 33, wherein the configuring is triggered by an affirmative action.

43. The apparatus of claim 42, wherein the affirmative action is a release of a push-to-talk (PTT) button.

44. The apparatus of claim 42, wherein the affirmative action is a lifting of a pointer from a screen of a wireless device transmitting the stream of data.

45. The apparatus of claim 33, wherein the stream of data comprises audio, video, and/or opaque data.

46. The apparatus of claim 45, wherein the opaque data is coordinate data of a pointer being dragged across a screen of a wireless device transmitting the stream of data.

47. The apparatus of claim 33, wherein the stream of data is media content in a group communication.

48. The apparatus of claim 47, wherein indicating the end of the stream of data indicates a release of a floor in the group communication.

49. The apparatus of claim 48, further comprising:
  logic configured to receive an acknowledgment of the release of the floor at a wireless device transmitting the stream of data.

50. The apparatus of claim 33, wherein a server detects the configuring of the at least one packet and updates a user context before receiving out-of-band signaling.

51. The apparatus of claim 33, wherein the at least one packet is the last packet of the stream of data.

52. An apparatus for detecting an end of a stream of data using in-band signaling, comprising:
  logic configured to receive the stream of data, the stream of data comprising multiple packets, each packet of the multiple packets including a header with a marker bit field and a payload;
  logic configured to detect that at least one packet of the multiple packets is configured to indicate the end of the stream of data,
  wherein the logic configured to detect comprises logic configured to detect that the marker bit field of the at least one packet is configured to indicate the end of the stream of data, that the payload of the at least one packet contains an amount of data less than payloads of other packets of the multiple packets, and/or that the payload of the at least one packet contains a field indicating a countdown to a last packet of the stream of data;
  logic configured to detect, at a server, out-of-band signaling indicating the end of the stream of data before detecting the configuring of the at least one packet, wherein the server performs the configuring in response to the detecting the out-of-band signaling;
  logic configured to transmit the configured at least one packet to at least one target device; and
  in event that no marker bit and no out-of-band signaling is detected, the server generates a packet comprising a new marker bit and transmits the generated packet with the new marker bit to the at least one target device, wherein the new marker bit indicates the end of the data stream.

53. The apparatus of claim 52, wherein the logic configured to detect comprises the logic configured to detect that the marker bit field of the at least one packet is configured to a given bit pattern to indicate the end of the stream of data.

54. The apparatus of claim 52, wherein the at least one packet is one of a range of packets immediately preceding the last packet.

55. The apparatus of claim 54, wherein each packet of the range of packets contains a field indicating the countdown to the last packet.

56. The apparatus of claim 52, further comprising:
  logic configured to determine the last packet of the stream of data based on the detecting.

57. The apparatus of claim 56, further comprising logic configured to update a user context at a wireless device receiving the stream of data in response to the determining the last packet of the stream of data.

58. The apparatus of claim 57, further comprising logic configured to transmit an acknowledgment to a wireless device transmitting the stream of data that the user context has been updated.

59. The apparatus of claim 52, wherein the stream of data is a first stream of data received from a first wireless device, the apparatus further comprising:
- logic configured to receive a second stream of data from a second wireless device; logic configured to buffer the first stream of data and the second stream of data; and logic configured to switch from playing the first stream of data to playing the second stream of data in response to the detecting.

60. The apparatus of claim 52, further comprising:
- logic configured to determine that a time since a last packet was received is greater than a threshold; and
- logic configured to determine, in response, that the stream of data has ended.

61. The apparatus of claim 52, wherein a server determines that a time since a last packet was received is greater than a threshold, and in response, generates the packet containing the marker bit field configured to indicate the end of the stream of data and transmits the generated packet to a target device.

62. The apparatus of claim 52, wherein the marker bit field is utilized to mark an end of an audio stream.

63. The apparatus of claim 52, wherein the marker bit field is utilized to mark an end of a video stream.

64. The apparatus of claim 52, wherein the header is a Real-time Transport Protocol (RTP) header.

65. An apparatus for indicating an end of a stream of data using in-band signaling, comprising:
- means for transmitting the stream of data, the stream of data comprising multiple packets, each packet of the multiple packets including a header with a marker bit field and a payload;
- means for configuring the marker bit field and the payload of at least one packet of the multiple packets to indicate the end of the stream of data, wherein the means for configuring the marker bit field and the payload comprise means configured to set the marker bit field in the at least one packet to indicate that the payload of the at least one packet is less than payloads of other packets of the multiple packets, and means for setting a field in the payload indicating a countdown to a last packet of the stream of data;
- means for detecting, at a server, out-of-band signaling indicating the end of the stream of data before detecting the configuring the marker bit field and the payload of the at least one packet, wherein the server performs the configuring of the marker bit field and the payload in response to the detecting the out-of-band signaling;
- means for transmitting the configured at least one packet to at least one target device; and
- in event that no marker bit and no out-of-band signaling is detected, the server generates a packet comprising a new marker bit and the means for transmitting the generated packet with the new marker bit to the at least one target device, wherein the new marker bit indicates the end of the stream of data.

66. An apparatus for detecting an end of a stream of data using in-band signaling, comprising:
- means for receiving the stream of data, the stream of data comprising multiple packets, each packet of the multiple packets including a header with a marker bit field and a payload;
- means for detecting that at least one packet of the multiple packets is configured to indicate the end of the stream of data, wherein the means for detecting comprises means for detecting that the marker bit field of the at least one packet is configured to indicate the end of the stream of data, that the payload of the at least one packet contains an amount of data less than payloads of other packets of the multiple packets, and that the payload of the at least one packet contains a field indicating a countdown to a last packet of the stream of data;
- means for detecting, at a server, out-of-band signaling indicating the end of the stream of data before detecting the configuring of the at least one packet, wherein the server performs the configuring in response to the detecting the out-of-band signaling;
- means for transmitting the configured at least one packet to at least one target device; and
- in event that no marker bit and no out-of-band signaling is detected, the server generates a packet comprising a new marker bit and the means for transmitting transmits the generated packet with the new marker bit to the at least one target device, wherein the new marker bit indicates the end of the stream of data.

67. A non-transitory computer-readable medium for indicating an end of a stream of data using in-band signaling, comprising:
- at least one instruction for transmitting the stream of data, the stream of data comprising multiple packets, each packet of the multiple packets including a header with a marker bit field and a payload;
- at least one instruction for configuring the marker bit field and the payload of at least one packet of the multiple packets to indicate the end of the stream of data, wherein the at least one instruction for configuring the marker bit and the payload comprises at least one instruction for that sets the marker bit in the at least one packet to indicate that the payload of the at least one packet is less than payloads of other packets of the multiple packets, and at least one instruction for setting a field in the payload indicating a countdown to a last packet of the stream of data;
- at least one instruction for detecting, at a server, out-of-band signaling indicating the end of the stream of data before detecting the configuring the marker bit field and the payload of the at least one packet, wherein the server performs the configuring of the marker bit field and the payload in response to the detecting the out-of-band signaling;
- at least one instruction for transmitting the configured at least one packet to at least one target device; and
- in event that no marker bit and no out-of-band signaling is detected, the server generates a packet comprising a new marker bit and the at least one instruction for transmitting transmits the generated packet with the new marker bit to the at least one target device, wherein the new marker bit indicates the end of the stream of data.

68. A non-transitory computer-readable medium for detecting an end of a stream of data using in-band signaling, comprising:
- at least one instruction for receiving the stream of data, the stream of data comprising multiple packets, each packet of the multiple packets including a header with a marker bit field and a payload;
- at least one instruction for detecting that at least one packet of the multiple packets is configured to indicate the end of the stream of data, wherein the at least one instruction for detecting comprises at least one instruction for detecting that the marker bit field of the at least one packet is configured to indicate the end of the stream of data, that the payload of the at least one packet contains an amount of data less than payloads of other packets of the multiple packets, and that the payload of the at least one packet contains a field indicating a countdown to a last packet of the stream of data;
at least one instruction for detecting, at a server, out-of-band signaling indicating the end of the stream of data before detecting the configuring of the at least one packet, wherein the server performs the configuring in response to the detecting the out-of-band signaling;
at least one instruction for transmitting the configured at least one packet to at least one target device; and
in event that no marker bit and no out-of-band signaling is detected, the server generates a packet comprising a new marker bit and the at least one instruction for transmitting transmits the generated packet with the new marker bit to the at least one target device, wherein the new marker bit indicates the end of the stream of data.

* * * * *